(12) United States Patent
Krijger et al.

(10) Patent No.: US 9,564,050 B2
(45) Date of Patent: Feb. 7, 2017

(54) METHODS AND SYSTEMS FOR DETERMINING INFORMATION RELATING TO THE OPERATION OF TRAFFIC CONTROL SIGNALS

(71) Applicant: TomTom International B.V., Amsterdam (NL)

(72) Inventors: Paul Krijger, Amsterdam (NL); Stefan Nico Anton Bollars, Helmond (NL)

(73) Assignee: TomTom International B.V., Amsterdam (NL)

(*) Notice: Subject to any disclaimer, the term of this patent is extended or adjusted under 35 U.S.C. 154(b) by 287 days.

(21) Appl. No.: 14/326,535

(22) Filed: Jul. 9, 2014

(65) Prior Publication Data

US 2015/0015421 A1    Jan. 15, 2015

(30) Foreign Application Priority Data

Jul. 9, 2013 (GB) .................................. 1312306.2

(51) Int. Cl.

| G08G 1/00 | (2006.01) |
|---|---|
| G08G 1/096 | (2006.01) |
| G08G 1/01 | (2006.01) |
| G08G 1/0967 | (2006.01) |
| G08G 1/0968 | (2006.01) |

(52) U.S. Cl.
CPC ............ *G08G 1/096* (2013.01); *G08G 1/0129* (2013.01); *G08G 1/0145* (2013.01); *G08G 1/096716* (2013.01); *G08G 1/096741* (2013.01); *G08G 1/096827* (2013.01); *G08G 1/096844* (2013.01)

(58) Field of Classification Search
None
See application file for complete search history.

(56) References Cited

U.S. PATENT DOCUMENTS

| 7,617,042 | B2 | 11/2009 | Horvitz et al. | |
|---|---|---|---|---|
| 8,306,725 | B2 | 11/2012 | Son et al. | |
| 8,478,500 | B1* | 7/2013 | Vahidi | B60T 7/18 340/932 |
| 2002/0008637 | A1* | 1/2002 | Lemelson | G08G 1/07 340/907 |
| 2008/0004793 | A1* | 1/2008 | Horvitz | H04W 4/027 701/487 |
| 2011/0095906 | A1* | 4/2011 | Stahlin | G08G 1/095 340/905 |
| 2013/0158794 | A1 | 6/2013 | Wilson | |
| 2016/0036558 | A1* | 2/2016 | Ibrahim | H04K 3/92 455/297 |

FOREIGN PATENT DOCUMENTS

| DE | 102010048675 A1 | 6/2011 |
|---|---|---|
| WO | 2013060774 A1 | 5/2013 |

* cited by examiner

*Primary Examiner* — Julie Lieu

(57) ABSTRACT

Data indicative of the durations of multiple instances of different phases of a traffic control signal in a given time period is determined. The data is used to obtain data indicative of a distribution of the durations of each phase. The distribution data is used to obtain data indicative of a probability of the traffic control signal having a given phase at one or more future time. The probability data may be used to provide an expected waiting time when arriving at the signal at a future time and/or a speed recommendation for a vehicle approaching the signal.

17 Claims, 11 Drawing Sheets

METHODS AND SYSTEMS FOR DETERMINING INFORMATION RELATING TO THE OPERATION OF TRAFFIC CONTROL SIGNALS

CROSS-REFERENCES TO RELATED APPLICATIONS

This application claims priority from United Kingdom Patent Application No. 1312306.2, filed Jul. 9, 2013. The entire content of this application is incorporated herein by reference.

FIELD OF THE INVENTION

The present invention relates to methods and systems for determining information relating to the operation of traffic control signals, and in particular, although not exclusively, to methods for predicting the timing of future phases of a traffic control signal. In some aspects and embodiments, the present invention extends to methods for determining expected waiting times at traffic control signals. The present invention also extends to methods of using determined information relating to the operation of traffic control signals. In accordance with yet further aspects and embodiments, the present invention relates to methods of determining a route through a network of navigable segments and/or in providing speed recommendations.

BACKGROUND OF THE INVENTION

Information relating to the operation of traffic control signals may be useful in various contexts. Methods and systems have previously been proposed in which information or recommendations are provided to drivers based upon information relating to the operation of traffic control signals, e.g. traffic lights. In some methods, information may be provided to drivers regarding the state of upcoming traffic control signals, e.g. along a route being navigated. The information may be used to provide a speed recommendation to drivers. For example, a driver may be advised as to an appropriate speed of travel to enable them to arrive at a traffic control signal in order to coincide with a green phase of the signal, i.e. to ride a "green wave" through a series of traffic control signals. Information about the operation of traffic control signals may be used to advise as to appropriate speeds of travel to enable a driver to travel through a region containing one or more sets of traffic control signals in a more efficient manner, in terms of travel time and/or fuel usage. Knowledge of traffic control signal operation is also useful in determining more accurate travel times, e.g. by navigation devices, or for infrastructure planning, etc, and in optimising routes, e.g. with respect to travel time.

Information about the operation of traffic control signals has previously often relied upon traffic control signal operation data obtained from third party sources (e.g. governmental traffic sources). Such data may often be based upon data collected from fixed traffic sensors in the vicinity of traffic control signals. Techniques of this type offer limited flexibility in terms of the data available and the traffic control signals for which data is provided, and are relatively expensive to implement, requiring the appropriate fixed infrastructure to be in place.

WO 2013/060774 A1 entitled "Methods and Systems for determining information relating to the operation of traffic control signals" describes methods of determining information relating to the operation of a traffic control signal using positional data relating to the movement of vehicles with respect to time along a path controlled by the traffic control signal (so-called vehicle "probe" data). The application describes methods by which the probe data may be used to predict future transition times between phases of the traffic signal. A cycle time for the signal may be derived.

The Applicant has realised that there remains a need for further methods and systems for determining information relating to the operation of traffic control signals, and which, in particular, although not exclusively, may be used to determine information relating to the operation of traffic control signals which do not operate in accordance with a predetermined cycle plan having phase durations that are set in advance. Such traffic control signals may be referred to as "dynamically managed" traffic control signals, and operate in accordance with cycles in which the durations of different phases are variable, usually between predetermined upper and lower limits. The durations of the phases may typically be variable in response to demand, e.g. based on the actual traffic conditions at an intersection where the signal is located. For example, where there is a large quantity of traffic wishing to follow a particular path through the signal, the duration of a phase of the traffic control signal permitting traffic flow along that path may be increased to permit the passage of a greater number of vehicles per cycle. Traffic control signals may be dynamically managed in various manners. For example, the traffic control signals themselves may be arranged to sense demand on the approach to the signal, e.g. queuing traffic, or alternatively or additionally traffic control signals may communicate directly with approaching vehicles to sense their presence. In other arrangements, traffic control signals may alternatively or additionally be managed remotely through communication with a traffic management centre, e.g. through wireless or wired infrastructure, in a manner responsive to demand. It will be appreciated that determining information relating to the operation of such dynamically managed traffic control signals may present particular challenges due to the inherent unpredictability of their operation.

SUMMARY OF THE INVENTION

In accordance with a first aspect of the invention there is provided a method for determining information relating to the operation of at least one traffic control signal, the traffic control signal being operable to transition between different phases in use, the method comprising:

using data indicative of the durations of multiple instances of at least one phase of the traffic control signal to determine, for the or each phase, data indicative of a distribution of the durations of the multiple instances of the phase; and using the determined distribution data to obtain data indicative of a probability of the traffic control signal having a given phase at one or more future time.

Thus, in accordance with the invention, data relating to the durations of multiple instances of one or more phase of a traffic control signal is used to obtain, for the or each phase, data indicative of a distribution of the durations of the multiple instances of the phase of the signal. The distribution data is used to determine a probability that the traffic control signal will have a given phase at a particular future time of interest. Thus, the invention uses probabilistic techniques to determine the likelihood of the signal having a particular phase at a particular future time based upon the actual operation of the signal.

In this way, the methods may be applied even to a traffic control signal which has at least one phase whose duration is variable in response to demand, i.e. which duration is not set in advance. By using data indicative of durations of multiple different instances of one or more phase of such a traffic signal in operation, it is possible to predict future phase timings for the signal using a probability based method. The invention does not rely upon being able to determine fixed cycle time or predictable timing of transitions between phases within a cycle. Of course, while the invention is particularly applicable to traffic control signals having at least one phase that is variable in response to demand, the invention is not limited in its application to such traffic control signals, and may equally be applied to traffic control signals in which the durations of each phase are predetermined, e.g. which operate in accordance with a predetermined cycle plan. As the methods of the present invention are based upon data indicative of the actual duration of phases of a traffic control signal, they may be carried out using appropriately obtained data, without needing to know whether or not the phase durations of the signal are variable, and are able to given an appropriate output regardless of whether one or more of the phases of the signal turn out to be variable.

The present invention also extends to a system for determining information relating to the operation of a traffic control signal. Thus, in accordance with a second aspect of the present invention there is provided a system, which may be a server, for determining information relating to the operation of at least one traffic control signal, the system comprising:

means for using data indicative of the durations of multiple instances of at least one phase of the traffic control signal to determine, for the or each phase, data indicative of a distribution of the durations of the multiple instances of the phase; and means for using the determined distribution data to obtain data indicative of a probability of the traffic control signal having a given phase at one or more future time.

The present invention in this further aspect may include any or all of the features described in relation to the first aspect of the invention, and vice versa, to the extent that they are not mutually inconsistent. Thus, if not explicitly stated herein, the system of the present invention may comprise means for carrying out any of the steps of the method described.

The present invention is a computer implemented invention, and any of the steps described in relation to any of the aspects or embodiments of the invention may be carried out under the control of a set of one or more processors. The means for carrying out any of the steps described in relation to the system may be a set of one or more processors. A given step may be carried out using the same or a different set of processors to any other step. Any given step may be carried out using a combination of sets of processors. The system may further comprise data storage means, such as computer memory, for storing, for example, the duration data, the distribution data and/or the data indicative of the probability of the traffic control signal having a given phase at one or more future time.

In general, the system of the present invention in any of its embodiments may be at least one processing device. The or a processing device may be a device of a mobile device, such as a navigation device, whether a PND or an integrated device, or may be a device of a server.

In some embodiments the method of the present invention in any of its aspects or embodiments is carried out using a navigation device, and the present invention extends to a navigation device arranged to carry out the steps of the method of any of the aspects or embodiments of the invention. The navigation device may be a PND or an integrated, e.g. in-vehicle, device. In accordance with any of the aspects or embodiments of the invention the navigation device may comprise a display for displaying an electronic map to a user, a set of one or more processors configured to access digital map data and cause an electronic map to be displayed to a user via the display, and a user interface operable by a user to enable the user to interact with the device. Thus, the system of the present invention may be a navigation device, e.g. a processing device thereof.

In other embodiments the method of the present invention in any of its aspects or embodiments may be carried out by a server, and the present invention extends to a server arranged to carry out the steps of the method of any of the aspects or embodiments of the invention. The system of the present invention of any of its aspects or embodiments may be a server, e.g. a processing device thereof.

Of course, the steps of the method of the present invention in any of its aspects or embodiments may be carried out in part by a server and in part by a navigation apparatus. The steps of the method may be performed exclusively on a server, or some on a server and the others on a navigation device in any combination, or exclusively on a navigation device. Performance of one or more of the steps on the server may be efficient and may reduce the computational burden placed on a navigation device. Alternatively if one or more steps are performed on the navigation device, this may reduce any bandwidth required for network communication. Thus, the system of the present invention may be provided in part by a navigation device or other mobile device, and in part by a server.

As used herein, the "duration" of a phase of the traffic signal refers to the time that the traffic signal has that phase for a particular instance of the phase. The duration of the phase will be defined between a transition time from another phase to that phase and a transition time from the phase to another phase. As used herein, a transition time of the traffic control signal refers to a time at which a transition between different phases of the traffic control signal occurs. An instance of a phase refers to a single occurrence of that phase, e.g. within a cycle of the traffic control signal.

References to the "duration data" herein refer to the data indicative of the durations of multiple instances of at least one phase of the traffic control signal. References to the "distribution data" herein refer to the data, for the or each phase, indicative of the distribution of the durations of the instances of the phase.

The methods of the present invention may be implemented in relation to one or more traffic control signal. Thus, any of the steps described herein in relation to "a traffic control signal" may be carried out in relation to the or each traffic control signal that is considered. For ease of reference the methods and systems of the invention may be described in relation to the or "a" traffic control signal. However, it will be appreciated that the steps may equally applied to any or each other traffic control signal considered where multiple traffic signals are involved.

The present invention relates to at least one traffic control signal that is operable to transition between different phases in use. The phases include a phase allowing traffic flow along a path controlled by the traffic control signal and a phase preventing traffic flow along a path controlled by the traffic control signal. In other words the phases are "go" and "stop" phases for the path being controlled. In preferred embodiments in which the traffic control signal is a traffic light, the phases may be red and green phases of the traffic light. Of course, the traffic control signal cycle may, and typically does, comprise one or more additional phases. In embodiments the traffic control signal cycle further comprises a yellow phase. Such additional phases, e.g. a yellow phase, may be considered as part of another one of the phases, e.g. the red or green phase, for the purposes of implementing the present invention, e.g. when identifying the phase(s) for which distribution data is obtained. The appropriate choice may depend upon the local law applying to the traffic control signal. For example, where vehicles may travel along the path controlled by the traffic control signal during a yellow phase, such a phase may suitable be treated as a part of the green phase. Alternatively additional phases may be treated as distinct further phases such that the traffic control signal transitions between three or more phases.

The traffic control signal may provide an indication of phases other than in terms of a colour. For example, the phases may be indicated by one or more symbols. Such arrangements may be used in connection with traffic control signals for controlling movements of public transport vehicles, e.g. trams, trains, etc.

In accordance with the invention in any of its aspects or embodiments, the traffic control signal is a traffic control signal which may act to control different vehicle movements along a path. The path may comprise at least a portion of one or more navigable segments, e.g. at an intersection. The traffic control signal may be any automated traffic control signal. Preferably the traffic control signal is a traffic light. The traffic control signal is preferably located at an intersection. The intersection is an intersection where there are competing movements of traffic. The intersection may be a roundabout, crossing or any type of intersection. The traffic control signal may be one of a plurality of traffic control signals located at the intersection.

The method of the invention involves using data indicative of the durations of multiple instances of at least one phase of the traffic control signal to determine distribution data which, in accordance with the first and second aspects of the invention at least, is then used to obtain probability data. It will be appreciated that distribution data may be determined for only one of the phases of the traffic control signal. However, in other embodiments distribution data is obtained for two or more different phases of the traffic control signal, and in preferred embodiments for two different phases of the traffic control signal. The distribution data is therefore obtained for at least some of the phases of the traffic control signal, and in embodiments, each phase of the traffic control signal. In embodiments the distribution data is obtained at least for a phase allowing traffic to pass along a path controlled by the traffic control signal and optionally for a phase that prevents traffic from passing along the path controlled by the traffic control signal. Where distribution data is determined in relation to more than one phase of the traffic control signal, this may be carried out in accordance with any of the embodiments described. Thus, any discussion relating to determining distribution data based thereon in relation to a phase, may be understood to be applicable to such steps carried out in relation to the or each of the at least one phase in respect of which such determinations are made.

The traffic control signal operates in accordance with a cycle comprising the different phases. Thus the phases of the traffic control signal are phases of a cycle of the traffic control signal. A given cycle of the traffic control signal is a cycle containing a complete set of the different phases of the traffic control signal through which the signal transitions. The sequence of phases of the traffic control signal will be repeated in subsequent cycles. Thus a given phase will have multiple instances over time, over different cycles. The cycle length for a given cycle is then defined by the time required to transition between a complete sequence of phases of the traffic control signal. Each transition between phases of the traffic control signal occurs at a transition time for that particular transition. As discussed below, a reference to the traffic control signal operating in accordance with a cycle does not imply that the phase durations within the cycle, or the timings of the phase transitions, are necessarily set in advance.

The traffic control signal may transition between the different phases in accordance with a predetermined automated traffic control signal cycle plan. A cycle plan refers to the operation of the traffic control signal over a plurality of cycles. The cycle plan determines the cycle length of the traffic control signal and the phases within the cycles e.g. the timing and/or durations of the phases. A predetermined cycle plan is a cycle plan in which the phase durations within each of a plurality of cycles of the traffic control signal, and a length of each of the cycles, are set in advance. Such a cycle plan will have a predetermined cycle length or lengths. A traffic control signal of this type may be referred to as a "statically managed" traffic control signal. For traffic control signals operating in accordance with a predetermined cycle plan, the duration of the phases within a cycle, and hence the cycle length of the signal, may be time dependent. For example, the cycle length may vary over the course of a day. The traffic control signal may be controlled to operate in accordance with one or more different predetermined cycle lengths in different time periods, e.g. within a 24 hour period, on different days of the week (such as the weekend versus weekdays), at peak times and non peak times on particular days, etc. Thus, phase durations of a traffic signal that operates in accordance with a predetermined cycle plan, and the cycle times thereof, may be fixed at least over a certain time period. While the phase durations and cycle length may vary depending upon time within a predetermined cycle plan, they vary in accordance with a cycle plan that is set in advance, e.g. being pre-programmed, and not in response to demand, i.e. as a result of actual traffic conditions.

As discussed above, the invention is, however, particularly applicable to traffic control signals which do not operate in accordance with a predetermined automated traffic control signal cycle plan, i.e. in which at least some phase durations within cycles of the signal are responsive to demand, and are not set in advance. Such traffic control signals do not have a predetermined cycle length, and may be referred to as "dynamically managed". This provides the ability to, for example, increase the "go" phase of the traffic signal where there is little traffic, even if this is in a period when heavier traffic might usually be expected (when a "statically managed" traffic control signal might be operated in accordance with a shorter predetermined "go" phase). It will be appreciated that the traffic control signal may not then necessarily be operated such that every incidence of a particular phase is not set in advance. For example, a fixed phase length may occasionally be used e.g. during initialisation. However, in normal operation, the traffic control signal is preferably operable such that the duration of at least one, and preferably a plurality of the different phases of the signal is variable in response to demand.

A phase may have a duration that is variable in response to demand within a predetermined permitted range of duration for that phase. It will be appreciated that only one of the different phases of the traffic control signal may be variable in this manner. In such cases, the phase is preferably at least a phase that permits flow of traffic along the path controlled by the signal, e.g. a green phase, is variable in response to demand. Preferably a phase that prevents flow of traffic along the path, e.g. a red phase, is also variable in response to demand.

In preferred embodiments, the duration of one or more, and preferably a plurality of, or each phase, of the traffic control signal, is variable in response to demand. Thus at least some of the phases of the traffic control signal have a duration that is variable in response to demand. The demand is preferably a vehicular demand. Thus, the operation of the traffic control signal is based upon demand by vehicles, and not just pedestrians. In accordance with preferred embodiments of the invention, the at least one phase for which distribution data is obtained (and, in accordance with the first and second aspects at least, used in obtaining probability data) includes a phase that is variable in response to demand (e.g. vehicular demand), and, in embodiments, the or each of the at least one phase is variable in response to demand. In some embodiments the traffic control signal may comprise a further phase which has a duration which is not responsive to demand, i.e. which is of fixed duration. In some embodiments at least a phase of the traffic control signal that allows traffic to pass along a path controlled by the traffic control signal is variable in response to demand, and distribution data is obtained at least for such a phase of the traffic control signal. The phase that is variable in response to demand may be a green phase of the signal.

It will be appreciated that the present invention may be applied to a traffic control signal where it is uncertain whether one or more phases thereof are of variable duration. The methods of the invention may equally be applied to traffic control signals in which one or more, or even each phase has a fixed duration. While the step of determining distribution data using the phase duration data may not be necessary for a phase of fixed duration, this step may still be performed, and the resultant data used together with distribution data relating to a variable phase in obtaining the probability data.

In embodiments in which a phase has a duration that is variable in response to demand, the duration of the phase may be variable in response to any measure indicative of demand. The demand may based on traffic conditions. The demand is the actual demand, e.g. resulting from actual traffic conditions. The demand is not an expected or predicted demand. The demand is preferably a current demand. The demand may be based upon traffic conditions specifically at the intersection where the signal is located, or may be based at least in part upon local traffic conditions. For example, the traffic control signal may be one of a group of traffic control signals which are together operated in a manner that is responsive to demand.

The traffic control signal may be operated such that the duration of the or each (variable) phase is variable in response to sensed demand. The demand may be sensed by the traffic control signal or by another entity. Another entity may then transmit data indicative of the sensed demand to the traffic control signal or data for controlling the signal in response to the sensed demand. For example, in some preferred embodiments the duration of the or each variable phase is variable in response to an amount of traffic arriving at the signal. The traffic may be traffic that arrives at the signal and passes through, or that arrives and is held in a queue, depending upon the phase of the traffic signal concerned. The amount of arriving traffic may be sensed using, for example, fixed loop induction systems, a video surveillance system, etc. Rather than being response to a sensed amount of traffic arriving at the signal in this manner, variation of the duration of a phase of the traffic signal in response to demand may be achieved in other manners. For example, a traffic control signal may sense arriving traffic by direct communication with an approaching vehicle, e.g. with a navigation device of the vehicle. The traffic control signal may be in bi-directional communication with a vehicle so as to be able to transmit data indicative of the future operation of the signal to the vehicle. In other arrangements the traffic control signal may be managed remotely in response to traffic conditions by a traffic management system, e.g. server. Thus, in accordance with preferred embodiments of the invention, the traffic signal may be any traffic signal that is operated in a manner that the duration of at least one phase is responsive to demand, whether the signal is arranged to autonomously operate in this manner, e.g. through sensing of arriving traffic, or is caused to operate in this manner under the control of remote management system, which has access to traffic information. Any traffic control signal of this type may be referred to as "dynamically managed".

The data indicative of the durations of multiple instances of the at least one phase of the signal may be directly or indirectly indicative thereof. The data is preferably indicative of the respective durations of each of a plurality of different instances of the or each phase in a given time period, to enable data indicative of a distribution of the durations of the or each phase to be determined for at least a portion of the time period. Thus, for each of the at least one phase considered, data indicative of the durations of multiple instances of the phase, e.g. in a given time period, is used to obtain the data indicative of a distribution of the durations of the instances of the phase, e.g. in at least a portion of the given time period. The number of different instances of a given phase for which data is obtained and/or the given time period may be selected as appropriate to provide data of a desired level of reliability, taking into account, e.g. the level of variability of phase durations for the traffic signal involved.

The multiple instances of a given phase may be instances associated with different, e.g. successive cycles of the signal. The multiple instances of a phase are preferably successive instances of a phase. The obtained data may indicative of the duration of every instance of the or each phase in a given time period. However, it will be appreciated that the duration of certain instances of a phase might be disregarded, e.g. if the phase has a length that exceeds a predetermined threshold. For example, if traffic levels are low along the path controlled by a particular signal that is one of a group of signals controlling paths at an intersection, the signal may be "skipped", resulting in an unusually long "stop" phase of the signal. Preferably duration data is obtained for each one of a set of more than two instances of each phase.

The data indicative of the durations of different instances of a phase or phases of the traffic control signal is indicative, for each of the at least one phase, of the durations of different instances of the phase of the traffic control signal, preferably in a given time period. The time period may be selected to have a length appropriate to reflect a sufficient number of instances of the or each phase that a meaningful distribution of the duration data for each phase may be obtained, while avoiding the need to use excessive amounts of data processing and/or storage power.

The time period may be a period in the recent past such that the phase duration data is indicative of the relatively current operation of the traffic signal, e.g. within the last five, ten, fifteen or thirty minutes. The data may then be considered to be "live" data. Live data may thus be thought of as data which is relatively current and relates to the operation of the traffic control signal within the last thirty, fifteen, ten or five minutes. It is envisaged that data may be received and stored at intervals to update corresponding previously stored data. For example, the data may be updated every 5 minutes. While such embodiments may allow more accurate predictions of the future operation of the traffic control signal to be made, being based upon the most recent operation of the signal, such techniques are more demanding in terms of processing and storage power.

In other embodiments the time period may be a historical time period. In this context the word "historical" should be considered to indicate data that is not live, that is data that is not directly reflective of the operation of the traffic control signal at the present time or in the recent past (perhaps within roughly the last five, ten, fifteen or thirty minutes).

The time period may be a time period corresponding to a timeslot of interest. The timeslot may be a timeslot at a particular time of day, day of the week and/or relating to a particular expected traffic intensity, e.g. peak, off-peak, etc. It is envisaged that duration data may obtained for a plurality of different time periods, corresponding to different timeslots, e.g. timeslots during the day, days of the week, traffic intensity levels, etc. When implementing the method of the invention, the duration data used should relate to a time period that will be relevant to the period for which a prediction of the operation of the traffic signal is to be made. For example, if a prediction is required for a morning peak time, then a time period corresponding to the morning peak may be used. The method may comprise obtaining the duration data for the time period from stored duration data relating to a plurality of different time periods. The given time period may not be predefined. The time period may merely be the time period which is defined between the earliest and latest phases to which the duration data relates.

In some preferred embodiments the data indicative of the durations of the multiple instances of a phase comprises data indicative of a list of durations of each of the multiple instances of the phase, e.g. in a given time period, and preferably of every instance of the phase in the given time period. In other embodiments the data may be otherwise indicative of durations of instances, whether directly or indirectly. For example the obtained data may comprise a list of transition times indicative of start and end times for each instance of a phase, etc. If the traffic signal operates in accordance with a predetermined cycle plan then the data may be indicative of a cycle time and the timing of at least one transition between phases for the signal.

The method may extend to the step of obtaining the data indicative of the durations of multiple instances of the at least one phase of the traffic control signal, e.g. in a given time period. The duration data may be obtained from any source or sources. The method may comprise receiving the data from a source or sources. For example, the data may be obtained from a third party data provider. The data may be obtained over any suitable communications network, such as a vehicle-to-vehicle (V2V) and/or a vehicle-to-infrastructure (V2I) communications network. In other embodiments the data might alternatively or additionally be received from a server. Alternatively or additionally the data may be obtained based upon data transmitted by the or a traffic control signal. Thus, in embodiments the data may be obtained from a third party data provider, from a server, from a vehicle, or from the or a traffic control signal. Alternatively or additionally, the data may be obtained from positional data relating to the movement of one or more device with respect to time along the path controlled by the traffic control signal. Such data may be referred to as "vehicle probe data". As described, for example, in WO 2013/060774 A1, the contents of which are incorporated herein by reference, such data may be used to determine data indicative of one or more times at which a transition between phases of a traffic control signal occurred. Accordingly, such data may be used to obtain data indicative of a duration of the phases of the traffic control signal. In some embodiments the method may extend to the step of generating the duration data, e.g. using "probe" data.

In embodiments it is envisaged that the duration data may be received from a server for use in accordance with the invention. The data may be received by a navigation device which then carries out the steps involved in obtaining the distribution data and, in accordance with the first and second aspects, the probability data. The data may be received in response to a request by the navigation device for the duration data relating to the traffic control signal. The traffic control signal may be a signal along a route being navigated. The route may be a pre-calculated route or an expected route as determined by the navigation device. The signal may be the next signal along the route being navigated. The server may store duration data in respect of a plurality of traffic control signals in a geographic region. In this way navigation devices may then request data as needed when they need to obtain probability data in respect of a particular traffic control signal. It will be appreciated that the duration data stored by the server in these embodiments may be received from any of the sources described, e.g. from a third party, from a vehicle, from a traffic control signal, from vehicle probe data, or combinations thereof. Of course other arrangements are possible. For example, a server might determine the distribution data using duration data stored by the server, and optionally the probability data, and then provide the data to a navigation device. The distribution data may be determined in response to a request by a navigation device. In other arrangements, all steps may be performed by a navigation device. Any step or steps may be performed by a server, a navigation device, or combinations thereof.

In accordance with the invention, the duration data is used in determining, for the or each of the at least one phase, data indicative of a distribution of the durations of the multiple instances of the phase, preferably in at least a portion of a given time period for which duration data is obtained. Where not otherwise stated, the distribution data refers to the distribution of durations of instances of a phase in at least a portion of a given time period to which the duration data relates. Thus distribution data is obtained for each of the at least one phase to which the duration data relates. Where multiple phases are considered, the distribution data determined for each phase may or may not be distinct. For example, distribution data may be obtained separately for each phase and then combined, e.g. summed or integrated. Thus, references to obtaining distribution data, e.g. of a particular form, for each of multiple phases, does not necessarily imply that the distribution data is distinct. The distribution data may be of any form. Preferably the data, for the or each phase, is indicative of an empirical distribution of the durations of the multiple instances of the phase (i.e. the or each phase of the at least one phase considered). In other words, an empirical distribution is obtained based on the duration data. The method may comprise obtaining, for the or each phase, a distribution function indicative of the distribution of the durations of the multiple instances of the phase, e.g. in the given time period, preferably an empirical distribution function. The method may comprise obtaining, for the or each phase, data indicative of a distribution profile of the durations of the multiple incidences of the or each phase. While the distribution data is preferably indicative of an empirical distribution, it is envisaged that the step of determining the distribution data may comprise data, for the or each phase, indicative of a model distribution indicative of the distribution of the durations of multiple instances of the phase based on the duration data for the phase. The data may be indicative of a model distribution function or profile. For example a model distribution function might be a normal distribution function.

The distribution data may be determined based on the duration data for the at least one phase in any suitable manner.

As mentioned above, in preferred embodiments at least, the data indicative of the durations of instances of the at least one phase of the traffic control signal that is obtained relates to a given time period, i.e. the durations of the incidences of the phase in the time period. The distribution data that is obtained is then indicative of the distribution of the durations of the or each phase in at least a portion of the time period. In other words, distribution data may be derived for only a portion of a time period for which phase duration data is obtained. This may facilitate processing of the data.

In accordance with the invention in its first and second aspects at least, the distribution data is used in obtaining the data indicative of a probability of the traffic control signal having a given phase at one or more future time. It will be appreciated that the distribution data may be determined as part of a single step in which the probability data is obtained from the duration data, and therefore may or may not form a distinct step to the determining of the probability data. The or each time for which the probability data is obtained is a future time. It will be appreciated that the phase whose probability at the future time is being determined, may or may not correspond to a phase for which distribution data was obtained. For example, the distribution data may be obtained for a green phase of a traffic light, and used to predict the probability of the light having a red phase at a time of interest. However, preferably the given phase to which the probability data relates includes at least one phase for which distribution data is determined. Preferably the phase is a phase which allows vehicles to pass along a path controlled by the traffic signal, i.e. a "go" phase, such as a green light. The probability data is then indicative of the probability of the signal having a phase allowing traffic to pass, e.g. a "go" or green phase.

The probability data is based upon the distribution data relating to the or each phase for which such data is determined. Thus, where the distribution data is obtained for multiple phases, the distribution data relating to each phase is used in obtaining the probability data.

The distribution data may be used alone in determining the probability data, or together with other data. In some preferred embodiments the method comprises using indicative of a timing of at least one instance of a phase of the traffic control signal, e.g. in a given time period to which the duration data relates together with the duration data in obtaining the probability data. The method may extend to obtaining the timing data. The timing data is preferably indicative of a transition time associated with the instance of the phase, e.g. a time of a transition to or from the phase from or to another phase. For example, the timing data may be indicative of a time at which a transition to a current phase of the traffic signal occurred. Timing data need only be provided in respect of one of the phases for which distribution data is determined where such data is obtained for multiple phases. However, timing data may be provided for each phase, or at least for multiple instances of one or more, or each phase. By providing timing data, a reference point for the duration data for the at least one phase with respect to time is provided. This may facilitate obtaining the probability data. However, it will be appreciated that specific timing data associated with the duration data need not necessarily be obtained, as, some timing data will be inherent in the duration data. In some embodiments the probability data is obtained using the obtained duration data and data indicative of a current state of the signal, the current state data being indicative of a current phase of the signal and a time of transition to the current phase.

The probability data may be obtained using the distribution data in any suitable manner. It will be appreciated that obtaining the probability data involves converting data indicative of a distribution of durations for a phase or phases, e.g. in a given time period to data indicative of the expected probability of the signal having a phase at one or more future time. It will be appreciated that the probability data for a given phase may be obtained using distribution data relating to the phase, or another phase, or a combination thereof. However, preferably at least distribution data relating to the phase for which probability data is to be determined is used.

In some preferred embodiments the method comprises using the distribution data to obtain data indicative of the probability of the traffic control signal having the given phase with respect to time, i.e. future time. In embodiments the method may comprise obtaining data indicative of the probability of the traffic control signal having the given phase with respect to time over a given future time period. Thus, the obtained probability data may be indicative of the probability of the traffic control signal having a given phase with respect to time over a given future time period. However, it will be appreciated that probability data may instead be determined individually for specific time(s) of interest. The probability data is preferably indicative of the probability of the signal having the given phase over a continuous range of time. In embodiments, the probability data is indicative of the variation in probability with respect to time.

The probability data may be indicative of a probability function. For example, the probability function may be a probability mass or probability density function indicative of the probability of the signal having the given phase with respect to time. The probability function is preferably indicative of the probability of the signal having the given phase over a continuous range of time. For example, the probability data may be in the form of a plot e.g. curve indicating probability with respect to time.

The probability data may be obtained by determining the probability that each of said one or more future time falls within said given phase of said traffic control signal.

The step of determining the probability data for the or each future time may comprise determining the probability of the or each future time coinciding with the given phase for each of a plurality of possible cycle plans of the traffic control signal. In embodiments the probability data may be obtained by combining, e.g. summing the respective probabilities of the time coinciding with the given phase in each of the plurality of possible cycle plans. That is, to determine the probability of a given phase at one or more times in the future, the probability of said one or more times falling within the given phase in the first possible cycle plan, second possible cycle plan, and so on may be summed. The probability of each possible cycle plan having a given phase at one or more times in the future can be calculated based on the distribution data. A "possible" cycle plan refers to a cycle plan, i.e. cycle length and phases within the cycle, which may fit the duration data.

In embodiments in which data indicative of the probability of the signal having the given phase with respect to time is determined, the method may comprise identifying data indicative of one or more turning points in the probability with respect to time, and determining a time associated with the or each turning point, e.g. with the position thereof. The or each turning point may be a maximum or minimum. Preferably data indicative of one or more maxima is identified and the corresponding time(s) determined. In these embodiments the probability data is preferably indicative of probability over a continuous range of time. Thus, the method may comprise obtaining data indicative of the probability of the traffic control signal having the given phase with respect to time over a given time period, wherein the probability data is indicative of one or more, and preferably a plurality of turning points, e.g. maxima or minima, with respect to time. A maximum or minimum in the probability will correspond to times at which it is determined to be most or least likely that the signal will have the given phase respectively. It will be appreciated that there may be multiple maxima and minima associated with times at which the probability has maximum and minimum values respectively over successive cycles. While the turning points may be turning points in a plot of probability against time, it will be appreciated that such a plot may not necessarily be derived, and the turning points, and their associated times, may simply be determined directly from the probability against time data. In some embodiments the time associated with a turning point is associated with a position of the turning point, i.e. in a plot of probability with respect to time.

The obtained probability data may be used in various manners. In some preferred embodiments the method comprises using the determined probability data to provide a speed recommendation for a vehicle. The vehicle may be a vehicle approaching the traffic signal. The method may comprise using the probability data to provide a speed recommendation for a vehicle to enable the vehicle to arrive at the traffic control signal at or around a time which is expected to coincide with a phase of the signal allowing the passage of traffic along a path controlled by the traffic control signal based on the probability data. The time expected to coincide with a phase of the signal allowing the passage of traffic is preferably a time at which the control signal is most likely to have a phase allowing the passage of traffic based on the probability data. In preferred embodiments as described above, the method comprises determining data indicative of the probability of the signal having the given phase with respect to time, and determining a time or times associated with one or more turning points, preferably maxima, identified in the probability. The time(s) may be associated with the position(s) of the or each turning point. The probability data is preferably indicative of the probability of the signal having a phase allowing the passage of traffic, i.e. a "go" or "green" phase. The time associated with the maxima will then be indicative of the most likely times of phases allowing the passage of traffic. The time may be identified by consideration of a position of the maximum in a plot of probability with respect to time. The method may comprise using the data indicative of one or more turning points, e.g. maxima, in providing the speed recommendation. The method may comprise using one or more times associated with identified turning points, e.g. maxima, in the probability data, in providing the speed recommendation. The one or more times may be associated with positions of the one or more maxima. The method may comprise providing a speed recommendation for a vehicle which will enable the vehicle to arrive at the traffic control signal at or around a time which coincides with a time associated with an identified turning point e.g. maximum in the probability data. Where the probability data comprises a plurality of maxima having associated with different respective times, the method may comprise selecting one of the times upon which the speed recommendation is to be based, to enable the vehicle to arrive at the traffic control signal at that time. The selection of the time may be based upon a current speed of the vehicle, and/or a speed limit governing the route from a current location to the traffic control signal. For example, the selected time may be one that may be achieved with minimal adjustment of the speed of the approaching vehicle, and/or which allows the vehicle to travel at a speed close to the relevant speed limit for the approach.

It is believed that using data indicative of a distribution of multiple instances of at least one phase of a traffic control signal in providing a speed recommendation is advantageous in its own right, whether or not that data is first used to determine probability data as described above.

In accordance with a further aspect of the invention there is provided a method of providing a speed recommendation for a vehicle to enable the vehicle to arrive at a traffic control signal at a time expected to coincide with a phase allowing the passage of traffic along a path controlled by the traffic control signal, wherein the speed recommendation is obtained using data indicative of a distribution of the durations of multiple instances of at least one phase of the traffic control signal.

In these embodiments the at least one phase of the traffic control signal for which distribution data is obtained preferably includes a phase allowing the passage of traffic. The traffic control signal is operable to transition between phases in use, which phases include a phase that allows the passage of traffic along a path controlled by the traffic signal, and a phase that prevents the passage of traffic along a path controlled by the traffic control signal. The method may extend to the step of determining the distribution data using data indicative of the durations of multiple instances of the at least one phase of the traffic control signal, e.g. in a given time period.

In accordance with a further aspect of the invention there is provided a system for providing a speed recommendation for a vehicle, the system comprising:

means for providing a speed recommendation for a vehicle to enable the vehicle to arrive at a traffic control signal at a time expected to coincide with a phase allowing the passage of traffic along a path controlled by the traffic control signal, wherein the speed recommendation is obtained using data indicative of a distribution of the durations of multiple instances of at least one phase of the traffic control signal.

The present invention in these further aspects may include any or all of the features described in relation to the first and second aspect of the invention, and vice versa, to the extent that they are not mutually inconsistent. Thus, if not explicitly stated herein, the system of the present invention may comprise means for carrying out any of the steps of the method described. In these further aspects, any of the steps and features, including, for example, the duration data, or the steps involved in obtaining the distribution data may be in accordance with any of the embodiments described above in relation to the first and second aspects of the invention.

Thus, any of the features described by reference to these further aspects of the invention may be used in the earlier aspects of the invention, and vice versa, to the extent they are not mutually inconsistent.

The system and method in these further aspects may be implemented by a server or a navigation device, or combinations thereof. For example a navigation device may determine the speed recommendation using distribution data obtained from a server, or may additionally determine the distribution data using duration data, which may be received from a server. Alternatively a speed recommendation may be determined by a server and transmitted to a navigation device.

In accordance with any of the aspects or embodiments of the invention involving determining a speed recommendation, including those described below based on expected waiting time, other data may be used in determining the speed recommendation. For example a current position of the vehicle may be used, and optionally data indicative of a current speed of the vehicle. The method may comprise additionally using data indicative of a timing of at least one instance of a phase of the traffic control signal, e.g. in a given time period, to which the duration data relates together with the duration data in obtaining the speed recommendation. The method may extend to obtaining the timing data. The timing data is preferably indicative of a transition time associated with the instance of the phase, e.g. a time of a transition to or from the phase from or to another phase. For example, the timing data may be indicative of a time at which a transition to a current phase of the traffic signal occurred. Timing data need only be provided in respect of one of the phases for which distribution data is determined where such data is obtained for multiple phases. In some embodiments the speed recommendation is obtained using the obtained duration data and data indicative of a current state of the signal, the current state data being indicative of a current phase of the signal and a time of transition to the current phase.

In accordance with any of the aspects or embodiments of the invention involving determining a speed recommendation, including those below based upon expected waiting time, the speed recommendation may be of any suitable form. Method of providing speed recommendations to vehicles are described, for example, in WO 2012/034582 A1 entitled "Improvements in or relating to portable processing devices"; the contents of which are herein incorporated by reference. The speed recommendation may be a recommendation of a single target speed. However, preferably the speed recommendation is in the form of a recommendation of a range of speed. The range of speed is a range within which it is determined a driver may travel in order to arrive at the traffic control signal to coincide with the given phase, e.g. a phase allowing the passage of traffic. The method may comprise providing the speed recommendation as a recommended speed window. The range of speed may be a range of speed which will result in the vehicle arriving at the control signal within given range around a time at which the signal is most likely to have a phase allowing the passage of traffic based on the probability data, e.g. a time associated with the position of a maxima. The time range around a most likely time may be a fixed time range, e.g. as a fraction of a cycle length, or may be determined by reference to the probability, e.g. being a time range in which the probability of the phase being one allowing the passage of traffic is above a given level.

The method may comprise outputting the speed recommendation to a driver or an Advanced Driver Assistance System (ADAS). This may be carried out in any suitable manner. The method may comprise displaying the speed recommendation to a driver. The speed recommendation may be displayed by displaying a recommended speed window. The method may comprise providing a graphical indication of the recommended speed to the driver. The step of providing a speed recommendation to a driver or ADAS may be carried out by a navigation device.

Alternatively or additionally, in some embodiments the method of the first and second aspects may comprise using the obtained probability data indicative of the probability of the traffic control signal having a given phase at a future time or times to determine an expected waiting time for a vehicle when arriving at the signal at one or more future time of interest. The future time of interest will be a time for which probability data has been determined, whether a discrete future time or a time in a range of time for which probability data has been determined. The expected waiting time is indicative of the time that a vehicle is expected to have to wait at the signal for a phase allowing the vehicle to pass along the path controlled by the signal when arriving at the time.

The expected waiting time may be obtained using the probability data in any suitable manner. It will be appreciated that such a time may be determined using probability data that is in relation to the probability of the signal having a given phase that is a "stop" phase or a "go" phase, as each will be directly or indirectly indicative of the timing of a "go" phase, i.e. where the probability relates to the "stop" phase, lower probabilities will be indicative of a greater likelihood of a "go" phase being encountered at the time. Preferably, however, the probability data is in relation to a phase allowing the passage of traffic, i.e. a "go" phase, such as a green light. In embodiments in which the method comprises identifying data indicative of one or more turning points, e.g. maximum or minimum, in the probability data with respect to time, the method may comprise using a time associated with an identified turning point, e.g. maximum or minimum, in determining the expected waiting time. Preferably a maximum is identified and used. The probability data then relates to a phase allowing the passage of vehicles along a path controlled by the traffic control signal. For example, the expected waiting time might be based upon a time difference between the time of interest for which the waiting time is being determined and the time at which a maximum in the probability occurs, e.g. indicative of the next likely "go" phase. Determination of expected waiting time may be carried out in other manners, and may involve more complex analysis. The expected waiting time may take into account the differing amounts of time that a vehicle might have to wait for a phase allowing it to pass under the various possible phase scenarios that may be encountered at that time. The data may involve using the probability data obtained in respect of one or more phases of the traffic control signal with respect to time.

It is believed that determining expected waiting time data based on data relating to a distribution of the durations of multiple instances of a phase of a traffic signal is advantageous in its own right.

In accordance with a further aspect of the invention there is provided a method for determining data indicative of an expected waiting time for a vehicle arriving at a traffic control signal, the traffic control signal being operable to transition between different phases in use, the method comprising:

obtaining the data indicative of an expected waiting time for a vehicle arriving at the traffic signal at one or more future times using data indicative of a distribution of the durations of multiple instances of at least one phase of the traffic control signal.

In accordance with a further aspect of the invention there is provided a system for determining data indicative of an expected waiting time for a vehicle arriving at a traffic control signal, the traffic control signal being operable to transition between different phases in use, the system comprising:

means for obtaining the data indicative of an expected waiting time for a vehicle arriving at the traffic signal at one or more future times using data indicative of a distribution of the durations of multiple instances of at least one phase of the traffic control signal.

The present invention in these further aspects may include any or all of the features described in relation to the first or second aspects of the invention, and vice versa, to the extent that they are not mutually inconsistent. Thus, if not explicitly stated herein, the system of the present invention may comprise means for carrying out any of the steps of the method described. In these further aspects, any of the steps and features, including, e.g. the duration data, the steps involved in obtaining the distribution data may be in accordance with any of the embodiments described above in relation to the first and second aspects of the invention. Thus, any of the features described by reference to these further aspects of the invention may be used in the earlier aspects of the invention, and vice versa, to the extent they are not mutually inconsistent.

It will be appreciated that the duration data indicative of the durations of different instances of a particular phase or phases of the traffic light may enable an expected waiting time to be determined, based upon the possible phase scenario that may be encountered when arriving at the signal at a future time or times.

In these embodiments the at least one phase of the traffic control signal for which distribution data is obtained preferably includes a phase allowing the passage of traffic. The traffic control signal is operable to transition between phases in use, which phases include a phase that allows the passage of traffic along a path controlled by the traffic signal, and a phase that prevents the passage of traffic along a path controlled by the traffic control signal. The method may extend to the step of determining the distribution data using data indicative of the durations of multiple instances of the at least one phase of the traffic control signal.

The system and method in these further aspects may be implemented by a server or a navigation device, or combinations thereof. For example a navigation device may determine the expected waiting time data using distribution data obtained from a server, or may additionally determine the distribution data using duration data, which may be received from a server. Any other arrangement may be used, however.

The method may comprise additionally using data indicative of a timing of at least one instance of a phase of the traffic control signal, e.g. in a given time period, to which the duration data relates together with the duration data in obtaining the expected waiting time data. The method may extend to obtaining the timing data. The timing data is preferably indicative of a transition time associated with the instance of the phase, e.g. a time of a transition to or from the phase from or to another phase. For example, the timing data may be indicative of a time at which a transition to a current phase of the traffic signal occurred. Timing data need only be provided in respect of one of the phases for which distribution data is determined where such data is obtained for multiple phases. In some embodiments the expected waiting time data is obtained using the obtained duration data and data indicative of a current state of the signal, the current state data being indicative of a current phase of the signal and a time of transition to the current phase.

In accordance with any of the aspects or embodiments of the invention in which expected waiting time at a given traffic control signal is determined, the time of interest for which expected waiting time is obtained, i.e. the time of arrival at the signal, may be a time at which the vehicle is expected to arrive at the traffic control signal when following a given route. The route is a route which involves passing along the path controlled by the traffic control signal, and may be any route from a first location to a second location. The route may be a pre-calculated route to a destination, or a portion thereof, or a route that it is expected the vehicle will follow, e.g. based upon a current trajectory, previous history, etc. The route may be a route being navigated, or yet to be navigated. The route might be an alternative route to at least a portion of an existing route being navigated. Thus the first location may be a current position, a position ahead of a current position along a route being navigated, or an origin. The second location may be a destination, or a position ahead of a current position along a route being navigated. The first and second locations may be automatically determined, or may be user specified, or combinations thereof.

The expected waiting time may then be used in obtaining a more accurate estimate as to expected travel time along the route e.g. from the first location to the second location. The method may further comprise using the determined expected waiting time in determining an estimated travel time for the route. The expected waiting time is indicative of the time delay that may be expected at the signal. This provides the ability to more accurately predicted travel times along routes and/or to estimate times of arrival than prior art techniques which could not take into account the likely phase of signals along the route, and would merely add arbitrary delay times to estimated route timings to account for the presence of signals along the route. The present invention accounts for the fact that, depending upon arrival time, a given signal may or may not give rise to a delay.

In some embodiments the method may further comprise determining an expected queue time at the traffic control signal, the expected queue time being indicative of the time a vehicle can be expected to queue before passing through the signal when arriving at the signal at an expected time. If there is a high traffic intensity, then a vehicle may have to queue before passing through the signal even if they arrive so as to coincide with a phase allowing the passage of vehicles. The method may comprise adjusting an expected waiting time at a signal and/or travel time for a route including a signal to account for expected queue time at the signal. Any of the methods described herein utilising expected waiting time at a signal or signals may also take into account expected queue time when arriving at the signal. Thus an additional delay factor may be taken into account. Queue times may be determined using e.g. historical vehicle probe data, and may be derived for different time periods in the day.

In accordance with the invention in any of its aspects and embodiments, the method may comprise carrying out any of the steps involved in obtaining an expected waiting time for a given traffic control signal in accordance with any of the aspects of the invention, in respect of a plurality of traffic control signals which control traffic flow along a path included in a route. The route may be of any of the types outlined above. The method may then comprise using each determined expected waiting time in determining an estimated travel time for the route. In embodiments in which an expected waiting time for one or more further traffic control signal is used, the waiting time at the or each subsequent traffic control signal may be dependent upon the expected waiting time determined for the or each previous traffic control signal.

In any of the embodiments in which expected waiting time is determined for one or more time of interest, the method may comprise obtaining data indicative of the expected waiting time with respect to time of arrival at the signal at a plurality of times in a given future time period, e.g. over a given future time period. The data indicative of the expected waiting time with respect to time is indicative of a variation in expected waiting time with respect to time of arrival when arriving at the signal at different times in the future time period. The data is preferably indicative of the expected waiting time over a continuous future time period. Such data may be obtained based on probability data with respect to time, when determined, or directly from distribution data. The data indicative of estimated waiting time with respect to time may be indicative of one or more turning points, e.g. maxima and minima. This reflects the cyclic nature of the operation of the signal.

In accordance with the preferred embodiments in which data indicative of expected waiting time with respect to time of arrival at a signal at different times over a given future time period is obtained, the method preferably comprises using the data to determine a speed recommendation for a vehicle. The speed recommendation is preferably one which is expected to minimise expected waiting time when arriving at the signal. The speed recommendation will result in the vehicle arriving at the signal at a time that minimises expected waiting time. The waiting time is "minimised" as determined using the expected waiting time data.

In some preferred embodiments data indicative of an expected waiting time with respect to time of arrival at the signal is obtained for each of a plurality of traffic control signals which control traffic flow along a path included in a route. The route may be of any of the types described above. The method may then comprise obtaining a speed recommendation for a vehicle travelling along the route which will minimise expected waiting time when travelling along the route based on the expected waiting time data obtained for each traffic control signal.

The steps of determining a speed recommendation to minimise expected waiting time along a route, or using expected waiting time to obtain a travel time along a route, may be carried out by a navigation device. The navigation device may carry out such steps using expected waiting time data provided by a server, or may itself determine the expected waiting time data. In the latter case the device may determine the expected waiting time using duration data provided by the server. For example, the method may comprise the navigation device providing data indicative of a route being followed to a server, and the server then providing the necessary data relating to traffic control signals along the route to the navigation device for use by the device. This may minimise the amount of data the navigation device need store, as the relevant data may be obtained from a server for those traffic control signals of interest. However, other arrangements are possible.

In accordance with yet further embodiments data indicative of an expected waiting time is obtained in respect of one or more, and preferably a plurality of traffic control signals associated with navigable segments of a navigable network, and used in generating a route through the navigable network. The route is a route from a first location to a second location and may be of any of the types discussed above. The second location may be a destination. The first location may be a current location or origin. The route is preferably a fastest route. In this way, the expected waiting time, indicative of a delay which may be incurred a traffic control signals which may be included in a route through the network is taken into account when generating a fastest route. The method may comprise using the expected waiting time data to generate a route through the navigable network which minimises expected waiting time at traffic control signals along the route. Again, such steps may be carried out by a server or a navigation device. In some embodiments the method may comprise a server generating the route and data indicative of the route for transmission to a navigation device. The server may transmit the data. The route may be generated at the request of the navigation device. For example, the device may provide the server with data indicative of the first and second locations for the route, with the server then generating a route by reference to expected waiting time. The data indicative of the route may be for transmission in any manner, and may or may not be directly indicative of the route itself. A hybrid route generation process between the server and navigation device may be used. For example, data may be generated for transmission that will cause the relevant navigable segments for inclusion in the route to be favoured when a routing engine of the navigation device itself generates a route. Of course, a navigation device might alternatively generate a route without interaction with the server.

Any references to a route herein may refer to a pre-calculated route or portion thereof, or any other path being followed or to be followed, e.g. an estimated route, etc. The route may be a route to a destination. The route may be a route being navigated or may be a planned route. The route is from a first location to a second location. The first location may be a current position, a position at or ahead of a current position along a route being navigated, or an origin of a route. The second location may be a destination, or may be a location ahead of a current position along a route being navigated.

As mentioned above, the steps of the method in accordance with the invention in its various aspects and embodiments may be carried out by different devices and/or in different locations. In preferred embodiments the methods are carried out by a server or a navigation device, or may be carried out in part by a navigation device and in part by a server. The way in which the steps of the methods are split between a server and navigation device may be selected as desired, and may be chosen to provide a balance as to demands upon data processing and/or storage power, and reducing bandwidth. While using a server to carry out certain of the processing steps may reduce the data processing and/or storage demands placed on a navigation device, this will necessitate the transmission of greater quantities of data between the server and navigation device, which may use bandwidth.

In some embodiments the method may comprise a navigation device receiving the data indicative of the durations of multiple instances of the at least one phase of the traffic control signal in a given period, which is used in the invention in its various aspects and embodiments, from a server. The method may comprise a server transmitting such data to a navigation device. In some embodiments the method is carried out by a navigation device, and further comprises the step of the navigation device obtaining the duration data from a server. The method may comprise a server storing the duration data. The server may store data indicative of the durations of multiple instances of at least one phase of the traffic control signal, for a plurality of traffic control signals, e.g. in a given geographic area.

The step of using the duration data to obtain distribution data in accordance with the invention in any of its aspects or embodiments may be carried out by a server or a navigation device, but in some preferred embodiments is carried out by a navigation device. Preferably the step is carried out using duration data obtained from a server. It has been found that this may be more efficient in terms of processing power, as the navigation device need not then store the duration data for the traffic control signal. The navigation device may request the duration data for a given traffic control signal from the server. The traffic control signal may be the next traffic control signal along a route being navigated, whether a pre-calculated route or not. The navigation device may then carry out the steps of determining probability data, and/or an expected waiting time, speed recommendation or route recommendation using the distribution data as appropriate in the various aspects of the invention. In other embodiments, determining the probability data might also be carried out by a server, with a navigation device then simply carrying out the steps involved in using that data, e.g. obtaining a speed recommendation, expected waiting time, route recommendation, etc.

The methods of the present invention in any of their aspects or embodiments may be implemented in relation to one or more traffic control signals. The traffic control signal may be any traffic control signal whose operation is of interest. In some embodiments the or each traffic control signal is a traffic control signal which controls traffic flow along a path included in a route. In accordance with the invention in any of its aspects and embodiments, the method may comprise carrying out the steps of obtaining probability data, and/or expected waiting time data, in respect of a plurality of traffic control signals which control traffic flow along a path included in the route.

In these further aspects and embodiments of the invention in which an expected waiting time is determined, the method may comprise obtaining data indicative of the expected waiting time for a vehicle when arriving at the traffic control signal at one or more times of interest. Data indicative of expected waiting time may be determined with respect to time over a given time period. For example, the corresponding expected waiting time may be derived for the or each time for which probability data is determined in embodiments where it is based upon the probability data.

In any of the embodiments in which a route is generated, a speed recommendation determined, a travel time determined, etc, for example using expected waiting time data, the method may comprise outputting and/or storing the determined route, recommendation or travel time. The output may be to a driver or an ADAS. The step of outputting may be in accordance with any of the embodiments described for outputting a speed recommendation above. The method may comprise displaying the route, recommendation or time to a driver. The outputting step may be carried out by a navigation device. The method may comprise providing a set of navigation instructions for guiding a driver along a generated route.

In certain embodiments discussed above, the duration data may be based upon data indicative of the position of a plurality of devices with respect to time, i.e. probe data. The positional data used in accordance with these embodiments of the invention may be collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the duration of phases of a traffic control signal. However, in preferred embodiments all positional data is associated with temporal data, e.g. a timestamp.

The positional data relates to the movement of the or each device with respect to time, and may be used to provide a positional "trace" of the path taken by the device. The data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc. The device may be associated with a vehicle. In these embodiments the position of the device will correspond to the position of the vehicle. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". The data obtained from devices associated with vehicles may be referred to as vehicle probe data. References to "probe data" herein should therefore be understood as being interchangeable with the term "positional data", and the positional data may be referred to as probe data for brevity herein.

A navigation device as referred to herein may be a vehicle based navigation device, and may be a PND or integrated device.

It will be appreciated that the methods in accordance with the present invention may be implemented at least partially using software. It will this be seen that, when viewed from further aspects, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENTS

Figure 1:
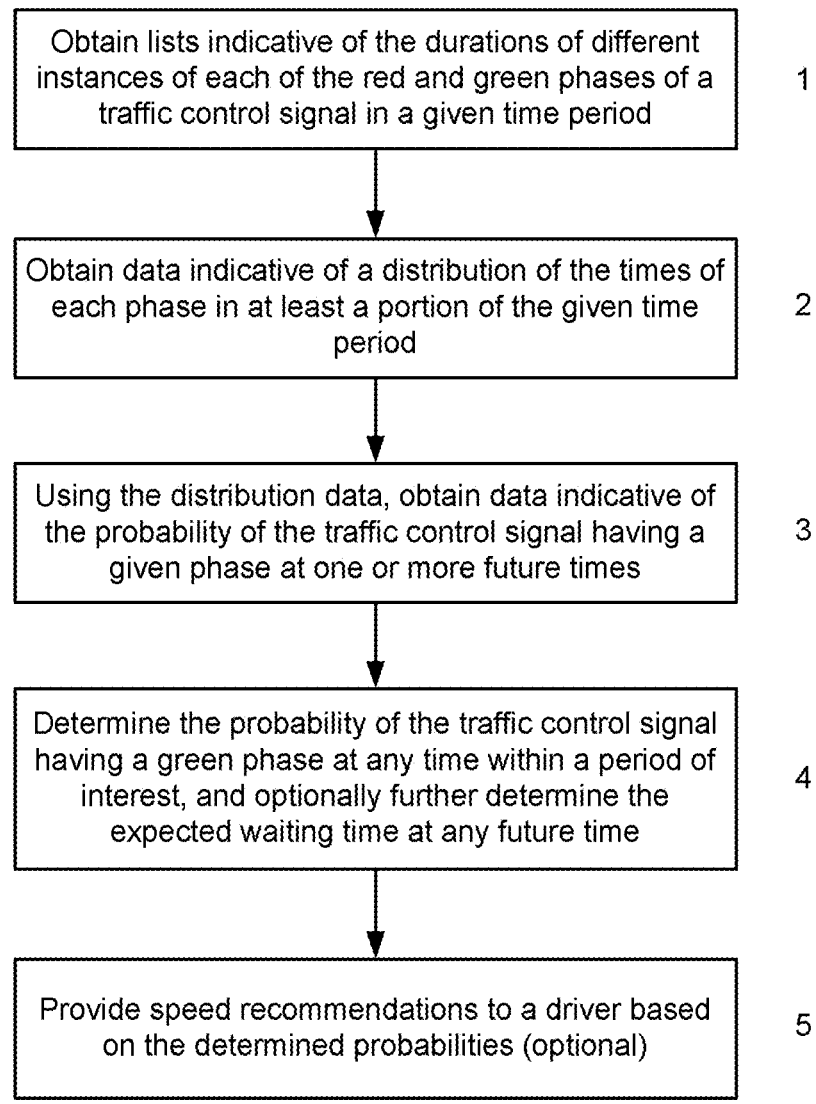
FIG. 1 shows a flow diagram of a method in accordance with a preferred embodiment of the present invention.

Some preferred embodiments of the invention will now be described. The present invention will be described by reference to a traffic control signal of a traffic control system. The traffic control signal may be, for example, a traffic signal of a traffic signal controlled crossing. The traffic control signal controls the flow along a particular path e.g. at an intersection. The traffic control signal may form part of a group of traffic controls signals at the intersection. The embodiments of the invention will be described, by way of example, with reference to a traffic control signal that is responsive to vehicle demand. Such a traffic control signal may be referred to as "dynamically managed". The traffic control signal has red and green phases whose durations are variable within predefined limits in response to vehicle demand. For example, where there is a high traffic intensity along a road segment approaching the traffic control signal, the duration of a green phase may be increased to allow the passage of a greater number of vehicles. The traffic control signal may be arranged to sense approaching vehicles in some manner. For example, the traffic control signal may be equipped with a suitable vehicle detection means, e.g. a camera. In other arrangements the signal may be able to communicate wirelessly with approaching vehicles which are equipped with a suitable communications module. The communication may be bi-directional, so as to allow the traffic control signal to impart information regarding its operation to the vehicles, e.g. upcoming green times, etc. It will be appreciated that the traffic control signal may also have a yellow phase. For the purposes of the present invention, the yellow phase is considered as part of the red or the green phase, depending upon whether it allows the passage of vehicles according to the relevant local law.

Although the present invention is described in conjunction with a traffic control signal whose phase durations are variable in response to demand, it will be appreciated that the techniques of the present invention may equally be applied to traffic control signal having only one phase, e.g. a green phase, whose duration is variable in response to demand, or even one which has no such phases, with each phase being fixed in accordance with a predetermined cycle plan (with the durations of the durations of the phases according to the predetermined cycle plan potentially then being time dependent, e.g. to provide different durations for a given phase in off peak times by comparison to peak times). Such traffic control signals may be referred to as "statically managed".

An embodiment of the invention which allows information about the operation of a traffic control signal to be obtained will now be described by reference to FIG. 1. More specifically, this embodiment is used to predict the likelihood of the traffic control signal having a particular phase, e.g. a green phase, at a future time.

In accordance with step 1, lists indicative of the durations of different instances of each of the red and green phases of the traffic control signal in a given time period are obtained. These may be obtained in various manners. In some embodiments the lists of green and red times may be obtained using sources of data which may include any one or ones of: third party data, vehicle probe data, vehicle-to-vehicle (V2V) and/or vehicle-to-infrastructure (V2I) data, and data obtained from the traffic control signal itself. Vehicle probe data is vehicle probe data received from devices associated with vehicles, e.g. equipped with navigation satellite systems, such as GPS devices, whose position corresponds to that of the vehicle. The probe data may alternatively be referred to as "positional data". The probe data is associated with temporal data, and may be used, for example, to derive probe traces relating to the travel of probe vehicles in a geographic region that includes the traffic control signal of interest. Such data may be used to infer the points in time at which the traffic control signal had a green phase or a red phase, e.g. as described in WO 2013/070774 A1. The duration lists may be derived by a server, which may also be arranged to collect the relevant data, e.g. through communication with traffic control signals, devices, vehicles, etc.

The lists of durations may include the duration of each instance of each of the red and green phases in the relevant time period. However, the duration of certain phase instances may be omitted if they are determined not to correspond to phase durations for the normal operation of the traffic control signal. For example, if the traffic intensity is low along a particular path controlled by a traffic control signal which has phase durations variable in response to demand, a cycle of the traffic control signal may be omitted to allow greater numbers of vehicles to pass along paths controlled by other traffic control signals forming part of a signal group including that traffic control signal. To avoid such situations distorting the duration data, red phase durations which are significantly greater than the cycle length may be omitted.

The duration lists for the red and green phases include the durations of different instances of each of the phases in a given time period. The time period may be a time period of interest, i.e. corresponding to the approximate timeslot to which the desired prediction is to relate. Duration lists may be stored, e.g. by a server, and, where appropriate derived, for each of a plurality of different time periods. For example, the time periods may include any or all of: night, morning rush hour, off peak morning/afternoon, evening rush hour and off peak evening. In other arrangements, red and green duration lists may be stored in relation to a time period corresponding to the previous 30 minutes and updated every 5 minutes. This more dynamic arrangement may provide better accuracy in predicting the operation of the traffic control signal, reflecting the most recent operation of the traffic control signal. However it would be more demanding in terms of processing power. The time period may be selected to have a length that is appropriate to provide a balance between accuracy of prediction, and use of processing and/or storage power. Where a traffic control signal is known to operate in accordance with a predetermined cycle plan, the time period may correspond to a time slot used in the cycle plan, e.g. over which the cycle times are constant.

Of course, it is not necessary that the duration data is in the form of lists of durations for the different phases in the given time period, although this is a particularly simple form of the data that may be easily processed in accordance with the invention. Any data directly or indirectly indicative of the durations of the different instances of the red and green phases in the time period may be used.

In addition to the duration lists for the red and green phases, data indicative of a current state of the traffic control signal is also determined. This data is indicative of the current phase of the signal, and the time that the signal has had that phase, i.e. the time elapsed since the transition of the signal to the current phase. Other forms of timing data may instead to be used to provide a time reference for the duration data. For example, a start time for the time period over which duration data is obtained may be used.

Once the duration data, i.e. lists of duration times, and the data relating to the current state of the traffic control signal, has been determined, the data is used in obtaining data indicative of a distribution of the times of each phase in at least a portion of the given time period to which the duration data relates-step 2 of the FIG. 1 process. It will be appreciated that the distribution data may be obtained for the same time period to which the duration data relates, or a portion thereof, to facilitate processing. The distribution data obtained is preferably an empirical distribution of the durations for each phase, although in other arrangements, it is envisaged that instead a model distribution, e.g. a normal distribution, profile may be fitted to the data.

Once the distribution data has been obtained, it is used to provide data indicative of a probability that the traffic control signal is green at any future time over a given time period of interest (step 3 of the FIG. 1 process). It will be appreciated that this step may not be distinct from the step of obtaining the distribution data. In addition, an expected waiting time, being the time that a vehicle arriving at the traffic signal at a particular time, t, is expected to wait for a green signal may be provided. The determination of the green signal probability and the expected waiting time is step 4 of the FIG. 1 process.

Thus, in preferred embodiments, at least the following data is obtained as an output of the method based on the duration lists:

p(t), the probability for a green signal at time t; and

W(t), the expected waiting time until green signal at time t.

Additionally/alternatively the probability for a red signal at time t may be obtained as an output. The model for traffic light phase prediction used in embodiments of the present invention models the traffic light as a cycle with one green time and one red time. A yellow phase may be incorporated in either of the red or green phases depending on the phase sequence of the lights. In the present examples, the yellow phase is incorporated in the green phase, which may be suitable for traffic light signals in the Netherlands and other countries where passage of vehicles is permitted under the yellow phase. Either or both of the red and green times may be variable. Where both red and green times are variable, each may be treated as an independent random variable.

The present invention uses knowledge of the distribution of red and green times to obtain information relating to the probability that a particular time falls within, for example, a green phase of a signal.

In embodiments, the probability that the light is green at time t, p(t), can be determined by summing the probability of the signal having a green phase at a time t over all possible cycles. For instance, in an exemplary embodiment of the present invention, calculating the probability of a green signal at a time t requires summing over at least the first, second, third, etc cycles. The green phase of these cycles can be considered to extend from:

$G_{1s}$ to $G_{1s} G_1$
$G_{2s}$ to $G_{2s}+G_2$
$G_{3s}$ to $G_{3s}+G_3$, etc.
with $G_{2s}=G_{1s}+G_1+R_1$, and so on.

The probability of the light being green at a time t can then be calculated by considering the probability that a time t falls within any of these ranges, i.e. by summing over all possible cycles.

In embodiments of the present invention, the start of the ith green time, $G_{is}$, the green times, $G_i$, and the red times, $R_i$, may each have an associated probability distribution function. From these the probability of the green phase for each cycle extending between any two points in time can be determined. Using the probability distributions of $G_{is}$, $G_i$ and $R_i$, the probability of each cycle having a green phase at a time t can be calculated. The probability of the traffic control signal having a green phase at a time t can then be obtained by summing over all possible cycles. These steps may essentially performed in a single summation.

As described further below, the probability distributions of $G_i$ can be obtained from, for example, a list of duration times. The start of the ith green time may also be obtained from this data or by using the probability distributions of the green and red times. In the latter case, the start of the ith green time may be distributed as:

$$G_{is} \sim \sum_{j=1}^{i-1} G_j + \sum_{j=1}^{i-1+r} R_j - a = \sum_{j=1}^{i-1} C_j + rR_i - a,$$

where $G_j$ and $R_j$ are the stochastic green and red times and a is the current state of the signal at time t=0.

The expected waiting time can also be calculated using the probability data obtained using the duration data. The expected waiting time can be defined as the expected difference between t and $G_{is}$, given that $G_{is}$ is the start time of the next green phase.

In a preferred embodiment, the expected waiting time is calculated by considering conditional probabilities. For instance, the expected waiting time at time t may be determined as the sum of: the expected waiting time given that the signal is red on arrival multiplied by the probability that the signal is red at time t; and the expected waiting time given that the signal is green on arrival multiplied by the probability that the signal is green at time t.

The expected waiting time given that the signal is red on arrival may be calculated using the following equation:

$$\mathbb{E}[G_{is} - t \mid G_{is} < t + R_i \text{ and } G_{is} > t] =$$

$$\begin{cases} \mathbb{E}[R_1] - a - t & \text{if } i = 1, \\ \dfrac{\int_{y=0}^{\infty} \left( \int_{x=t+a}^{x=t+a+y} x g_{i-1}(x) dx \right) r(y) dy}{\int_{y=0}^{\infty} \left( \int_{x=t+a}^{t+a+y} g_{i-1}(x) dx \right) r(y) dy} - a - t & \text{if } i > 1. \end{cases}$$

wherein r is the probability function of $R_j$ and $g_i$ is the probability density of $$\sum_{j=1}^{i} G_j + \sum_{j=1}^{i+r} R_j, \ i = 1, 2, \cdots$$

In the simplest case, it can be assumed that the queue time is zero. In this case the expected waiting time at a green light is zero. If the queue time is not zero, then a delay will be introduced. Methods for incorporating delays to account for queue times will be discussed later.

The above equations describe the case where both the red and green times are variable. If, for example, the red time is static, then the stochastic red times $R_i$ can be replaced by the deterministic red time R.

It may be desirable to increase the calculation speed of predictions in certain situations, e.g. where the calculations are to be performed by a navigation device. In such situations various approximations may be used. For instance, the double integrals above may be replaced with the following approximation using the expected value of the red time in the boundaries:

$$\mathbb{E}[G_{is} - t \mid G_{is} < t + R_i \text{ and } G_{is} > t] \approx$$

$$\begin{cases} \mathbb{E}[R_1] - a - t & \text{if } i = 1, \\ \dfrac{\int_{t+a}^{t+a+\mathbb{E}[R_j]} x g_{i-1}(x) dx}{\int_{t+a}^{t+a+\mathbb{E}[R_j]} g_{i-1}(x) dx} - a - t & \text{if } i > 1. \end{cases}$$

In an exemplary implementation of the present invention, to increase the calculation speed discretization may be used. In this case, the above integrals may be replaced with discrete sums. In one example, the green times, red times and time line in seconds, and consequently the associated distribution and probability data, are all discretized.

A preferred implementation, which is particularly suitable for use by navigation devices, is as follows.

Firstly, an exemplary process for calculating the empirical distributions of the green and red times will be described. The input to this process may be in the form of a list of red and green times (taking the yellow phase as part of the green). The start time of the period of measurement is also known, providing timing information for the phase data. In other words, in this example, it is known that the first green time commenced at 7:31:41 in the morning. The end time of the time period is also known.

An exemplary list of such times may be as follows. These are the green times during morning rush hour at a particular traffic control signal.

43, 34, 27, 33, 26, 31, 31, 35, 40, 36, 44, 30, 33, 29, 26, 31, 32, 46, 43, 28, 40, 26, 38, 28, 37, 37, 35, 30, 33, 36.

Between these green times, the following red times have occurred;

57, 63, 59, 65, 46, 65, 70, 66, 59, 69, 69, 72, 71, 69, 51, 68, 58, 72, 64, 60, 60, 57, 66, 58, 57, 52, 62, 70, 65, 64.

Let $x_1, x_2, \ldots, x_n$ be the green times of the traffic light and $y_1, y_2, \ldots, y_m$ the red times (which are all positive). The main idea of the implementation of the prediction model is described below. Define G(t) as the empirical distribution function of the green time and R(t) of the red time. The empirical distribution functions can be calculated by:

$$G(t) = \frac{1}{n} \sum_{i=1}^{n} 1\{x_i \le t\}, \ t = 0, 1, \cdots$$

$$R(t) = \frac{1}{m} \sum_{i=1}^{m} 1\{y_i \le t\}, \ t = 0, 1, \cdots$$

Here 1 is the indicator function. So G(t) is defined as the fraction of green times that are smaller or equal to t.

Figure 2A:
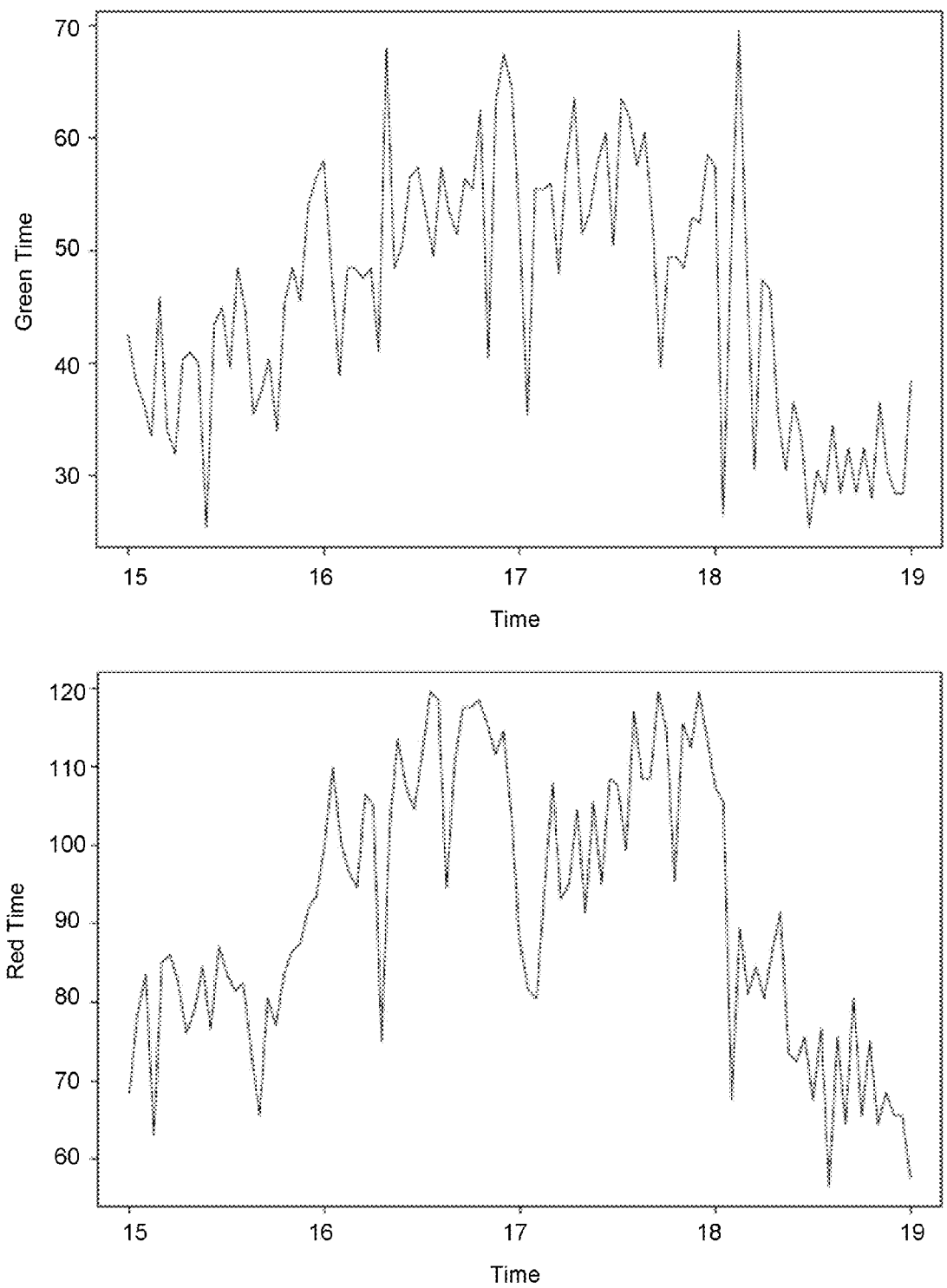
FIG. 2A shows measured green and red times in the period from 15:00 till 19:00 for a particular signal group at an intersection.
Figure 2B:
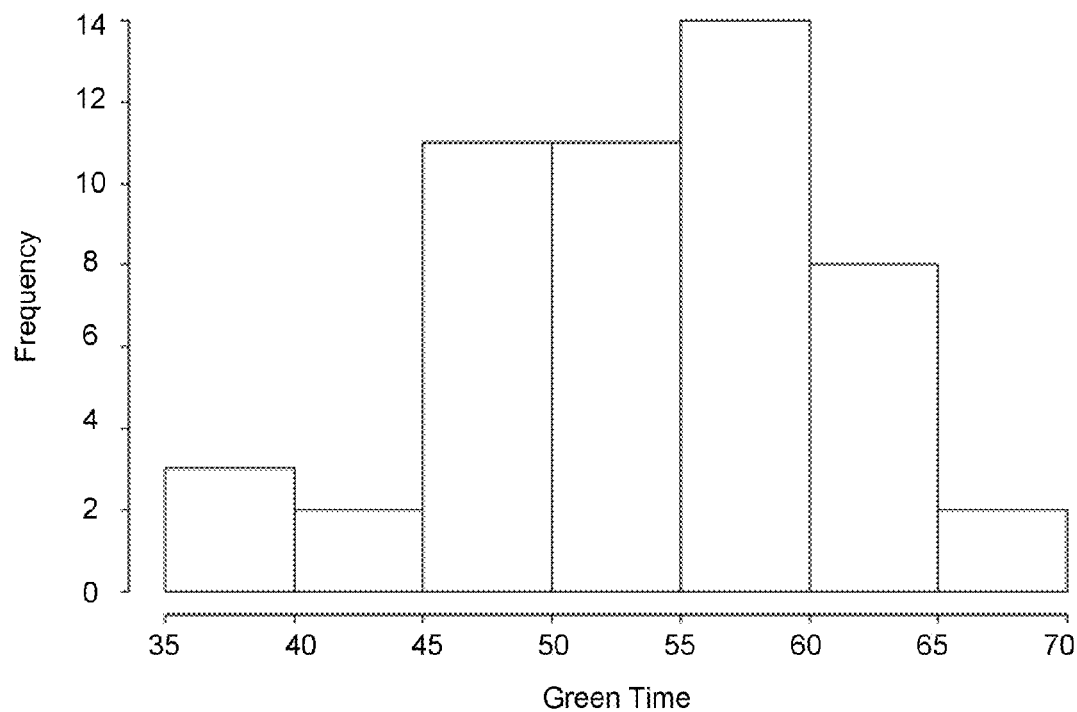
FIG. 2B shows histograms of the green and red times for the same intersection during evening rush hour, where at least the red times are not normally distributed.
Figure 2B:
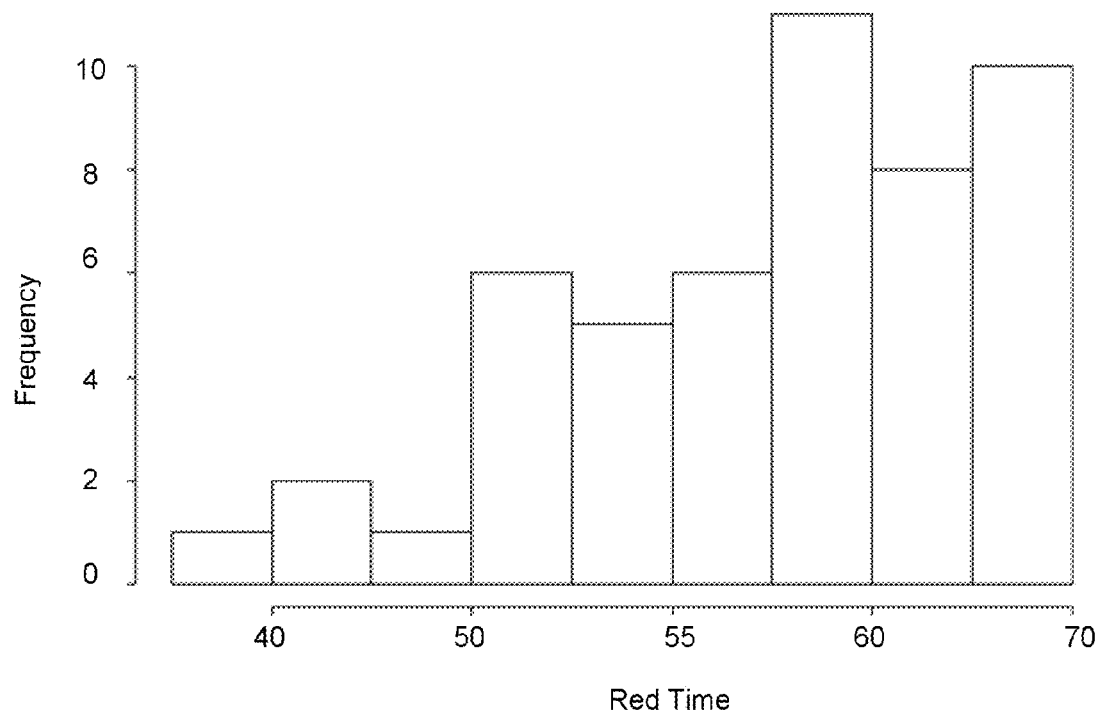
Figure 2C:
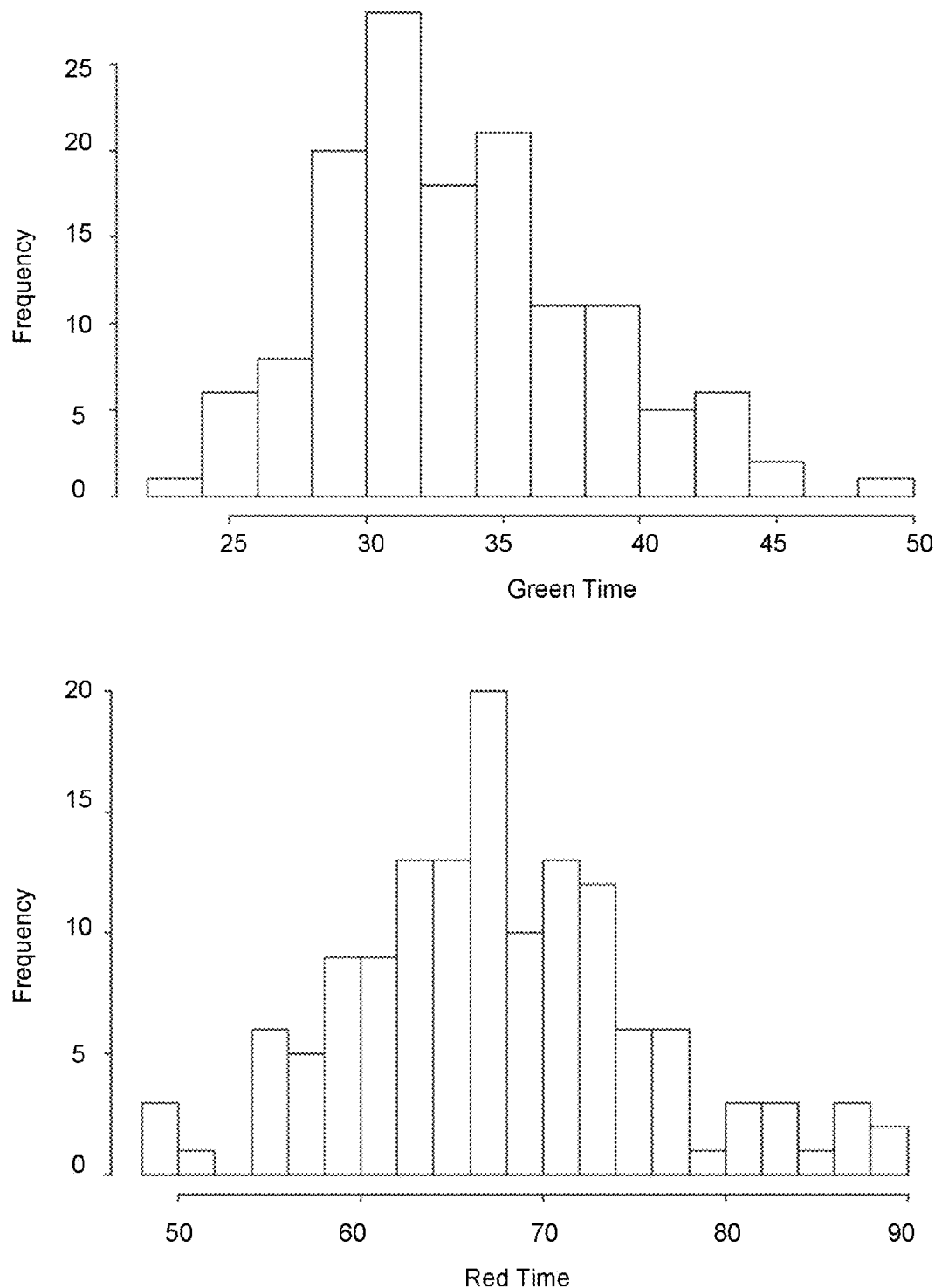
FIG. 2C shows histograms of the green and red times for the same intersection from 9:30 till 14:30, during which the times are approximately normally distributed.

A way in which green times and red times may be used to obtain distribution data for the durations of the respective phases is illustrated by reference to FIGS. 2A-C. FIG. 2A illustrates the measured green times and red times at a particular signal over the time period 15:00 to 19:00. Data of this type may be used to obtain the empirical distribution function. FIG. 2B shows histograms obtained using the green times and red times shown in FIG. 2A for the specific evening rush hour period of 16:00 to 18:00. FIG. 2C shows histograms of green times and red times for the same intersection for the time period 9:30 to 14:30. It can be seen that outside rush hour the times look normally distributed. During rush hour at least the red times are not normally distributed.

Once the distribution data has been obtained, it is used to provide data indicative of a probability that the traffic control signal is green at any future time over a given time period of interest—step 4 of FIG. 1. It will be appreciated that this step may not be distinct from the step of obtaining the distribution data.

In the preferred embodiment, this is done by converting the empirical distribution for the red and green times to data indicative of the probability of the traffic signal being green with respect to time. In order to do this, the green and red time distributions are converted to probability mass functions. The probability mass functions can be derived by:

$$g(t) = G(t) - G(t-1), \ t = 1, 2, \ldots$$

$$r(t) = R(t) - R(t-1), \ t = 1, 2, \ldots$$

Using convolution, it is possible to calculate the probability mass function of the sum of two random variables. The red and green times can be considered as such variables where the signal has variable red and green times.

Thus, the probability mass function of the traffic control signal cycle (the convolution of the green and red time) can be calculated as:

$$\begin{cases} (g*r)(t) = \sum_{i=0}^{t} g(i)r(t-i), & g_{min} + r_{min} \leq t \leq g_{max} + r_{max} \\ 0, & 0 \leq t < g_{min} + r_{min} \text{ or } t > g_{max} + r_{max} \end{cases}$$

Next all probability mass functions of necessary cycle combinations are calculated by using convolutions repeatedly. These cycle combinations are given by the sums of random variables in the equations. The required combinations are 1, 2, 3, ..., max cycles or 1, 2, 3, ..., max cycles plus one red time.

In theory the sums and integrals presented above should be performed from 1 to infinity. In practice, a good approximation can be retrieved by summing over only a few terms. In the preferred implementation, the sums are bounded, otherwise terms will be divided by numbers which are nearly zero.

The bounds of the sums can be derived by using the minimum and maximum green/red times of the given lists, i.e. the green and red time lists. Let $g_{min} = \min(x_i)$ and $r_{min} = \min(y_i)$. Define the maximum times as $g_{max}$ and $r_{max}$. Also use the fact that the green and red times are always positive.

By using these convolutions, the probability mass function for each cycle can be determined. The probability mass functions are then converted back to distribution functions, using the following relationship. Let m(t) be a probability mass function, the corresponding distribution function M(t) can be derived by:

$$M(t) = \sum_{i=1}^{t} m(t), t = 1, 2, \cdots$$

As discussed above, the probability of a green signal at any moment in the future may be determined by summing over the relevant distribution functions for each possible cycle. This may be facilitated, particularly when implemented on a navigation device, by using the convolutions discussed above.

Similar convolutions are also used to calculate conditional expectations, which are used for the expected waiting time until next green signal as discussed above.

For the predictions, either discrete or continuous variables can be used. This discrete case is described by the equations and may be preferred for implementation on a navigation device. For the continuous case, the sums become integrals and the probability mass function becomes a probability density function.

Figure 3:
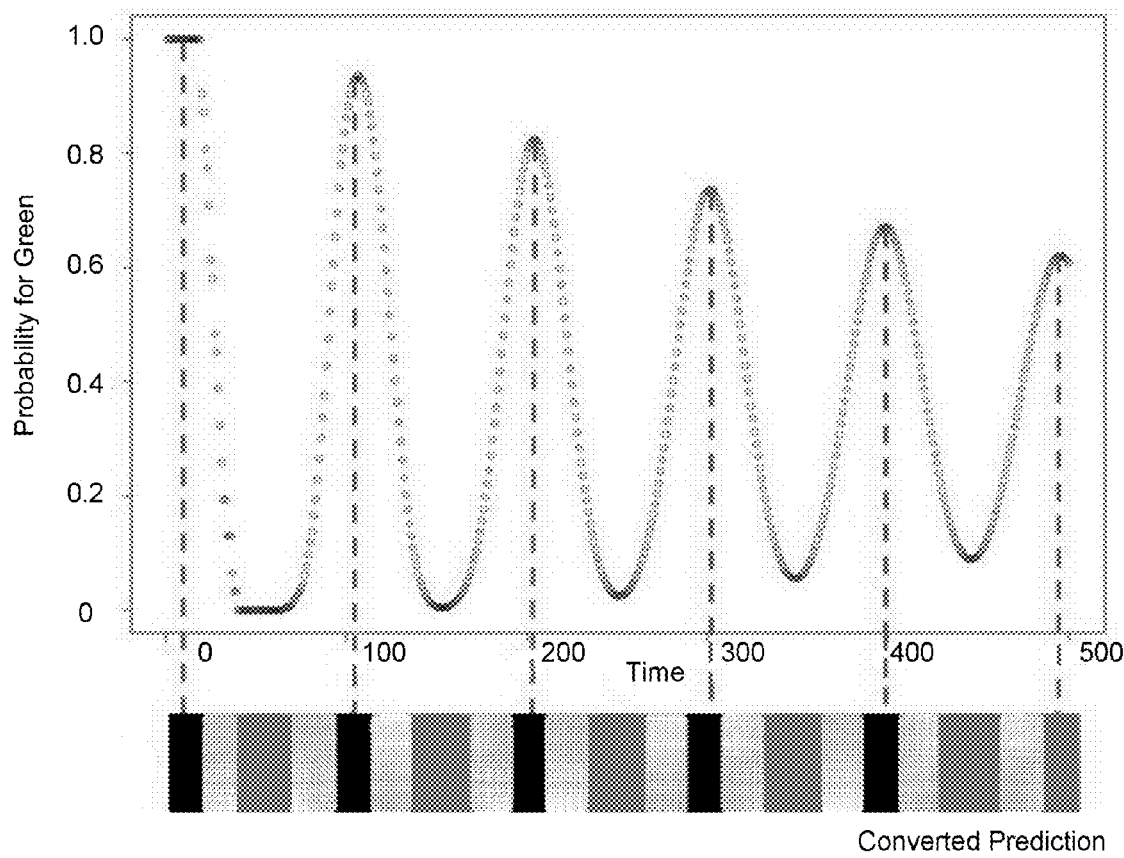
FIG. 3 shows the probability of green signal as a function of time, and the conversion into a visual prediction.

FIG. 3 illustrates a plot of the probability of the traffic control signal being green with respect to time over a given future time period of interest of the type that may be derived in accordance with the invention. It will be seen that the probability has repeated minima and maxima, corresponding to the minimum and maximum probabilities of a green signal in successive cycles of the signal.

This data may be used in various manners. One useful implementation is in obtaining a speed recommendation for a vehicle approaching the traffic signal—step 5 of the FIG. 1 process.

In order to derive a speed recommendation, the maxima and minima of a plot of the type shown in FIG. 3 may be used to determine time windows reflecting the ranges of time in which a vehicle arriving at the signal is expected to have the greatest chance of coinciding with a green signal. The relevant time windows can be determined by reference to the positions of the maxima, i.e. being a time window on either side of the central "maximum" time. Corresponding time windows may be determined around the minima being indicative of times of arrival when a vehicle has least chance of coinciding with a green signal (or, conversely, most chance of coinciding with a red signal). In between these times there may be time periods when it is less certain as to the phase of the signal.

In one exemplary embodiment, these time windows can be displayed graphically in a manner that helps to visualise the time periods which are most and least likely to coincide with a green signal, and if desired, the uncertain time periods therebetween. One such graphical representation is shown in the lower part of FIG. 3, and is in the form of a bar 10 with repeating strips of black, white (with dots) and grey as time increases. For the avoidance of confusion, this bar may be referred to as the "time" bar. The black bars correspond to the time windows of greatest likelihood of a green signal (i.e. those times around the maxima). The grey bars correspond to time windows with least likelihood of a green signal (i.e. around the minima). The dotted white bars are the "uncertain" time windows in between the black and grey windows.

The time windows as illustrated by the time bar in FIG. 3 can then be used to derive speed recommendations to enable a vehicle to arrive at the traffic control signal at a time corresponding to a green signal. It will be appreciated that such recommendations may be derived without obtaining the bar 10 shown in FIG. 3, i.e. direct from the plot of probability against time, or from other probability data, or even the underlying duration/distribution data, without calculating a plot as shown in FIG. 3. It will be appreciated that the time windows indicated by the time bar of FIG. 3 can readily be converted to speed recommendation windows for a vehicle approaching the traffic control signal. These may be displayed to a driver, e.g. using a PND of the vehicle. The way in which the time windows can be used to obtain a speed recommendation window will readily be understood. A suitable conversion may be based upon the time windows corresponding to the different portions of the bar, and data indicative of a distance between the vehicle and the traffic control signal. A time may be determined that the vehicle would arrive at the signal if it drove with the maximum permissible speed. This will define the earliest time at which the vehicle might arrive at the signal. From this time onward, the times associated with the start and end points of each portion in the bar shown in FIG. 3 may be derived. It will be appreciated that the different portions repeat over time, as the traffic control signal goes through successive cycles. Thus, there may be more than one range of speed that will correspond to arriving at a "black" time. A minimum speed of travel may be used to set a maximum time that is considered, and only speed recommendations above that speed of travel displayed.

Figure 4:
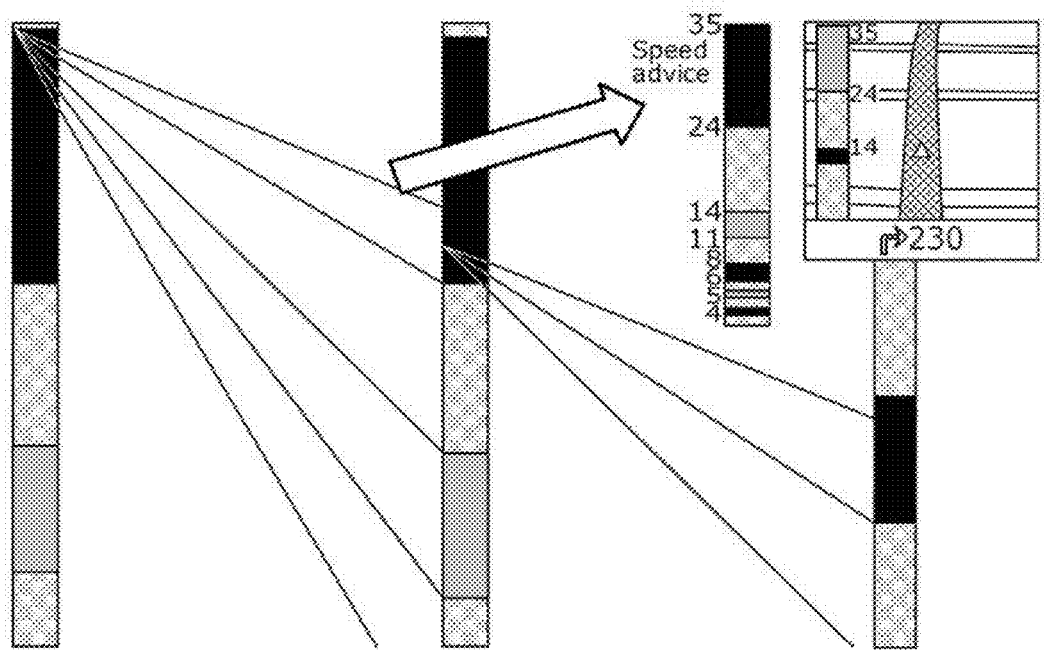
FIG. 4 shows how the converted predictions of FIG. 3 for a number of sequentially traversed traffic control signals can be used to provide speed recommendations to a driver.

An exemplary speed recommendation bar 30 is shown in FIG. 4, together with an indication of how this is derived from the time colour bar shown in FIG. 3. The vertical bar 20 in FIG. 4 is indicative of the time bar obtained in FIG. 3. Various lines emanate from a particular point (the current time) to the left of the vertical time bar 20 in FIG. 4 and intersect the vertical time colour bar at different points, i.e. times. Each of these lines is associated with a different speed of travel, starting with the maximum permissible speed 35 mph. The trajectory of the line connects the current time with the time of expected arrival at the traffic control signal along the time bar, based upon a particular speed of travel, and taking into account the distance between the current position of the vehicle and the position of the traffic control signal.

Here it can be seen that if the driver travels at 35 mph, he will arrive at the signal at a time within a black time window. This is the earliest permissible time of arrival. The speeds of travel required to arrive at the signal to coincide with the transition between this black portion of the time bar shown in FIG. 4 and the next portion, a grey one, and then each subsequent transition between portions is then determined. These speeds are indicated by the further lines connecting the current time with each transition in the time bar in FIG. 4, being 24 mph, 14 mph, 11 mph and 8 mph respectively. Speeds below 8 mph are not shown, but could similarly be derived. In general a minimum speed will usually be set, and times of arrival associated with speeds below the minimum speed threshold not considered.

A speed recommendation bar 30 is then derived based on this information. As shown in the right hand side of FIG. 4, this indicates a black portion, being from 24-35 mph. This is a speed window which should result in arrival within the black time window, and is therefore a recommended speed window. Below this, between 14 and 24 mph, there is a grey portion in the speed colour bar, indicating this is not a recommended speed of travel, (which is expected to result in arrival coinciding with a grey time window, e.g. a red signal phase). A white (with dots) portion is then present in the speed bar corresponding to the "uncertain" period, before another black portion appears. As shown in the screen display 40 in FIG. 4, a portion of the determined speed recommendation bar may be displayed to a driver by a PND. The PND may show only speeds above a certain minimum speed. This may enable the driver to select a suitable speed to arrive at the traffic control signal with maximum chance to coincide with a green signal, by choosing a speed within the black portion of the recommended speed bar.

An exemplary method for obtaining the time windows (upon which the time bar is based) will now be described.

First the probabilities p(t) are used to obtain black, dotted white and grey time windows. The probabilities for green signal are calculated for 1≤t≤endTime. The endTime will depend on the minimum speed we want to advise. If the vehicle arrives at the traffic signal at time $t_{minspeed}$ with driving at minimum speed, we can take endTime=$t_{minspeed}$. The black intervals indicate that the probability of green signal is high, so we try to lead the driver to this region to have maximum probability to catch green signal. The grey area indicates that the probability for red signal is high and in the dotted white windows the predictions are insecure. The middles of the black windows lie at the local maximums of the probability plot. The middles of the grey windows lie at the local minimums. The sizes of the black and grey windows can be changed. This may influence the performance of the predictions.

To get the local maximums and minimums, we make use of the finite difference coefficients. Define the difference as:

diff(t)=p(t+1)−p(t), t=1,2,3, . . .

We have a local maximum at $t_{max}$ if:

diff($t_{max}$−1)>0 and diff($t_{max}$+1)<0.

To be sure that the found local maximum is the local maximum of the entire green period, we calculate the maximum value of the neighbourhood. Define iocMax(t) as:

$$locMax(t) := \max_i p(i), \ t - averageGreen*0.5 \le i \le t + averageGreen*0.5$$

So we only pick $t_{max}$ as local maximum if p($t_{max}$)=iocMax($t_{max}$).
For an extra check we also want that p($t_{max}$) is greater than the expected probability:

p($t_{max}$)>averageGreen/(averageGreen+averageRed).

We have a local minimum at $t_{min}$ if:

diff($t_{min}$−1)<0 and diff($t_{min}$+1)>0.

To be sure that the found local minimum is the local minimum of the entire red period, we calculate the minimum value of the neighbourhood. Define locMin($t_{min}$) as:

$$locMin(t) := \min_i p(i),$$
$$t - averageRed*0.5 \le i \le t + averageRed*0.5$$

So we only pick $t_{min}$ as local minimum if p($t_{min}$)=locMin($t_{min}$).
For an extra check we also want that p($t_{min}$) is smaller than the expected probability:

p($t_{min}$)>averageGreen/(averageGreen+averageRed).

If we visualize GI % of the average green time and $t_{max}$ is a local maximum. We visualize the values $t_{max}$−averageGreen·(GI/100)/2≤t≤$t_{max}$+averageGreen·(GI/100)/2 as black.

If we visualize RI % of the average red time and $t_{min}$ is a local minimum. We visualize the values $t_{min}$−averageRed·(RI/100)/2≤t≤$t_{min}$+averageRed·(RI/100)/2 as grey.

In case that the traffic light is statically managed, or the predictions are still constant at the beginning, we visualize black if:

p(t)>0.99

(if the probability for green light is more than 99% we will visualize it, this can also be another value). We visualize grey if:

p(t)<0.01

The times which are not visualized by black or grey, will be visualized by dotted white. This indicates that the traffic light in unpredictable at these times.

When approaching the traffic control signal, speed recommendations based on the time bar may be displayed in the vehicle by a PND. By using the distance from the vehicle to the traffic signal, the time window may be converted to a speed advice window. First the point in the time window at which the vehicle is expected to arrive if the vehicle can drive with maximum speed is determined. This is done using knowledge of the speed limit on the road towards the intersection where the traffic control signal is found. Then all times where the section changes in the time bar are determined. For each of these times a corresponding speed to arrive exactly at this moment is determined. The determined speeds can be used to derive a speed recommendation bar, with portions indicating recommended and not recommended speeds, similar to the time bar. Note that if the time prediction window is infinite, the speed recommendation intervals convert to zero. It is clearly not desirable to recommend excessively low speeds (e.g. 1 mph). Therefore a minimum speed can be implemented and only speed advices between the boundaries shall be visualized as shown in FIG. 4.

As described above, the present invention may also determine an expected waiting time for the next green signal phase at different times in a future time period of interest based upon the phase duration distribution data. This may be determined using the distribution data, preferably based upon probability data for the signal having a given phase derived using the distribution data.

Figure 5A:
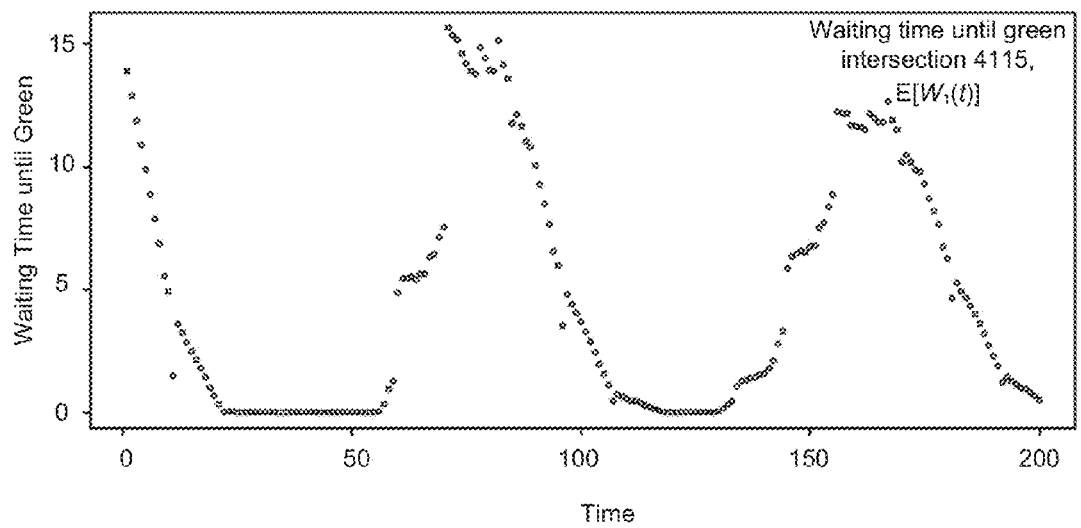
FIGS. 5A to 5C show the expected waiting times at three intersections.
Figure 5B:
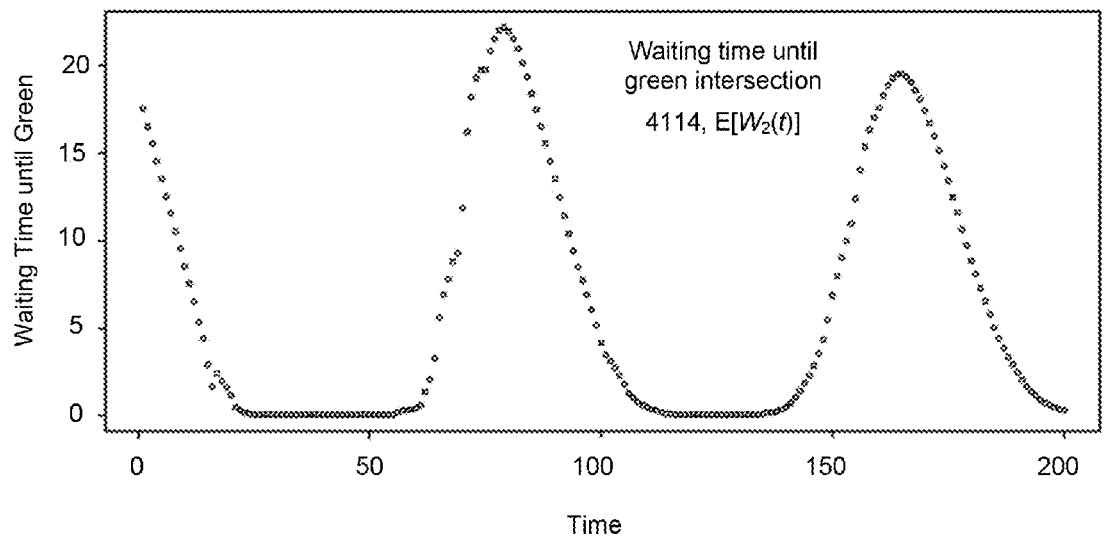
Figure 5C:
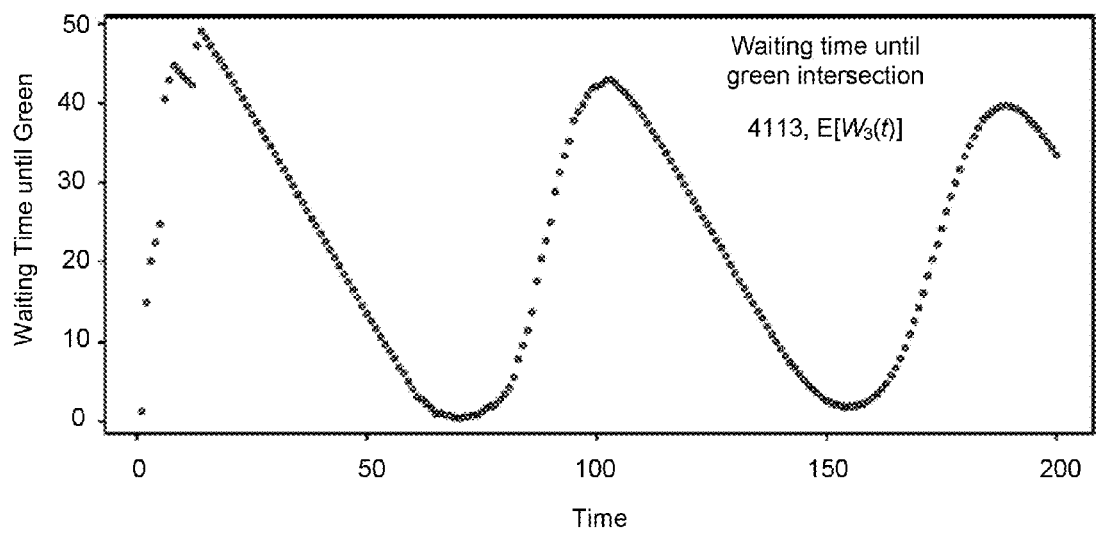

FIG. 5A-C illustrate plots of expected waiting time against arrival time at two different traffic control signals which were obtained using the methods of the present invention. It will be seen that the waiting time exhibits maxima and minima in a similar manner to the probability of a green phase for future times. This is to be expected, given the cyclical operation of the signal. When arriving at the start of a red phase, the waiting time to a green signal will be greatest, while at other times a vehicle may arrive during a green phase, corresponding to no waiting time.

The determined expected waiting time at a traffic control signal for future times may be used in several applications.

In one application, the expected waiting time is used to provide more accurate estimates as to travel times along a route to a destination.

When determining the duration of a route involving one or more traffic signals, prior art techniques tended to simply add a delay value for each traffic signal involved to the route duration obtained by consideration, for example, of average travel speed data associated with road segments making up the route. This delay value would be based upon an average delay expected at a traffic control signal. However, the actual delay at a traffic control signal will depend upon the phase of the signal encountered by a vehicle when arriving at a traffic signal, and how long the signal has had that phase. In accordance with the invention, the determined expected waiting time may be used to provide a time delay associated with a particular traffic control signal along a route which more accurately reflects the actual delay that the vehicle will experience when arriving at the signal.

The use of expected waiting time to estimate the expected time delay associated with traversing intersections along a route improves the existing route planning and can lead to faster routes and can also provide the ability to give drivers speed recommendations to enable them to ride a "green wave" through multiple sets of signals.

In one embodiment, data of the type shown in FIGS. 5A-C may be used to provide a speed recommendation to a vehicle which will minimise waiting time for a green signal at a traffic control signal. A speed recommendation may be determined to result in a vehicle arriving at the traffic signal in one of the periods where the expected waiting time is at a minimum.

While the techniques of the present invention have been described by reference to a single traffic control signal, corresponding expected waiting time data (and/or, in embodiments, data indicative of the probability of encountering a green phase) with respect to time may be obtained for multiple sets of traffic control signals in a region of interest. For example, p(t) and W(t) may be obtained for each traffic control signal in a region of interest, or, alternatively for each traffic control signal along a pre-calculated route. The latter arrangement may be more efficient in terms of processing and/or storage requirements.

Once a route from an origin or current position to a destination has been generated, the expected waiting time data for traffic control signals along the route may be used to provide a more accurate estimate as to the duration of the route.

Figure 6:
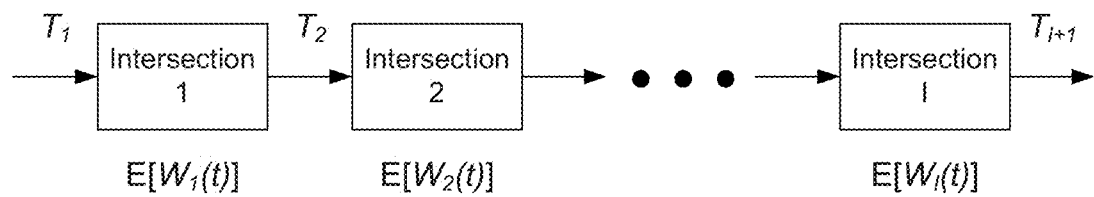
FIG. 6 illustrates how the expected travel time i.e. sojourn time can be determined from the expected waiting times at sequential intersections.

The route may be modeled as including various intersections along its length as shown in FIG. 6. The transit times for portions of the route between intersections may readily be determined, for example, by a navigation device as known in the art. This may be based, for example, upon transit time data associated with road segments forming the route, or average speed data and length data associated with the segments, etc. The transit time data may be an expected transit time based upon historical data, and alternatively or additionally may take into account "live" traffic conditions, e.g. actual congestion, etc. The duration of the route may be obtained by adding the time delay that can be expected to be encountered at each intersection to the transit times for the portions of the route between intersections. The time delay at an intersection is based on the expected waiting time for a vehicle arriving at the relevant time, i.e. the time that the vehicle is expected to reach that point along the route.

Referring to FIG. 6, for example, it takes $T_1$ seconds to drive to intersection 1, $T_2$ seconds to get from intersection 1 to intersection 2, etc. At each intersection the vehicle has to wait some time until the next green time. This delay is estimated by $W_i(t)$. If a route has I intersections with traffic signals, it can be broken down into I+1 sub routes as illustrated below:

Define $E[S(i)]$ as the expected travel time after i sub routes, just after Ti (for i=1, 2, ..., I+1). The expected total travel time from the route (also called the expected sojourn time) can now be computed with the following recursion:

$$E[S(1)] = T_1$$
$$E[S(2)] = E[S(1)] + E[W_1(E[S(1)])] + T_2$$
$$E[S(3)] = E[S(2)] + E[W_2(E[S(2)])] + T_3$$
$$\vdots$$
$$E[S(I+1)] = E[S(I)] + E[W_I(E[S(I)])] + T_{I+1}$$

The expected sojourn time of the route is $E[S(I+1)]$.

We can allow variation in the travel times between intersections. If we assume that $T_i$ is uniformly distributed between $a_i$ and $b_i$, then we calculate the expected travel times of the route for $T_i=a_i$, $T_i=(a_i+b_i)/2$ and $T_i=b_i$. If the route has I intersections, the approximation of the expected sojourn time is the average of all $3^{I+1}$ combinations. If the travel times between intersections are distributed differently, we can add more weight to the values that are more likely. It is believed that the distribution of travel times is dependent upon traffic intensity. The intention of allowing variation in the travel times between intersections, is to recognize the situation where it becomes uncertain whether the car will catch the green signal.

Figure 7:
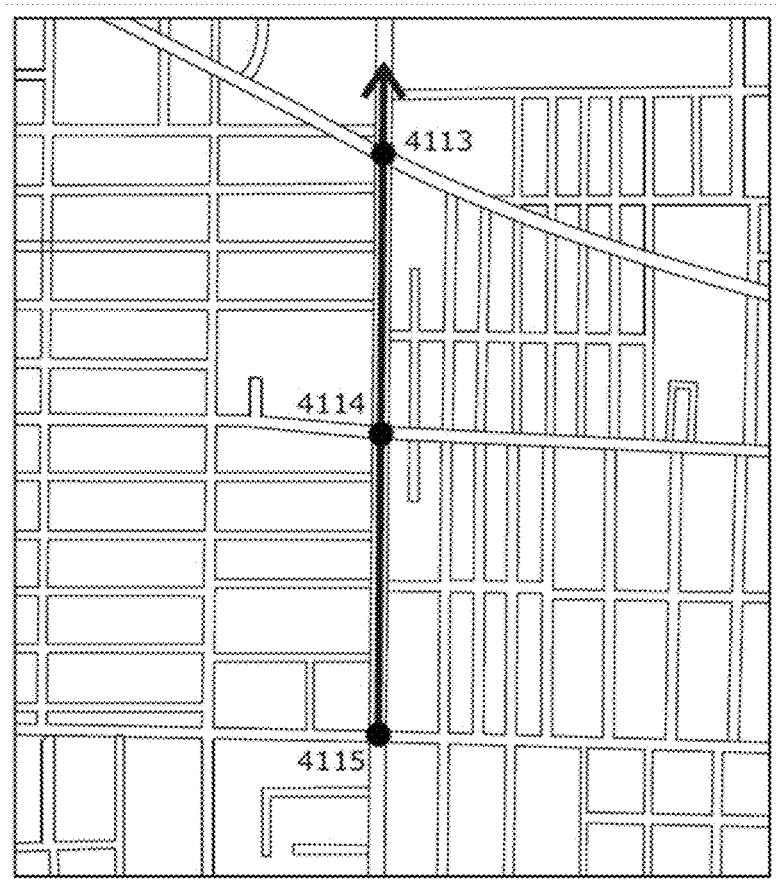
FIG. 7 shows the position of the intersections shown in FIGS. 5A to 5C.

An example of the determination of a travel time for a route including intersections having traffic control signals associated therewith will now be given. FIG. 7 illustrates one exemplary route in Portland.

In the example of FIG. 7, we want to calculate the expected sojourn time along a route including three signalized intersections. These are the intersections 4115, 4114, and 4113. The expected waiting times for the traffic control signals at each of these intersections with respect to arrival time is shown in FIGS. 5A, 5B and 5C respectively. The route extends from the moment of arrival at intersection 4115 until leaving intersection 4113. $E[S(4)]-E[S(1)]$ is calculated, where we define $T_4=0$ and $T_2=T_3$ uniformly between 21 and 25.

Figure 8:
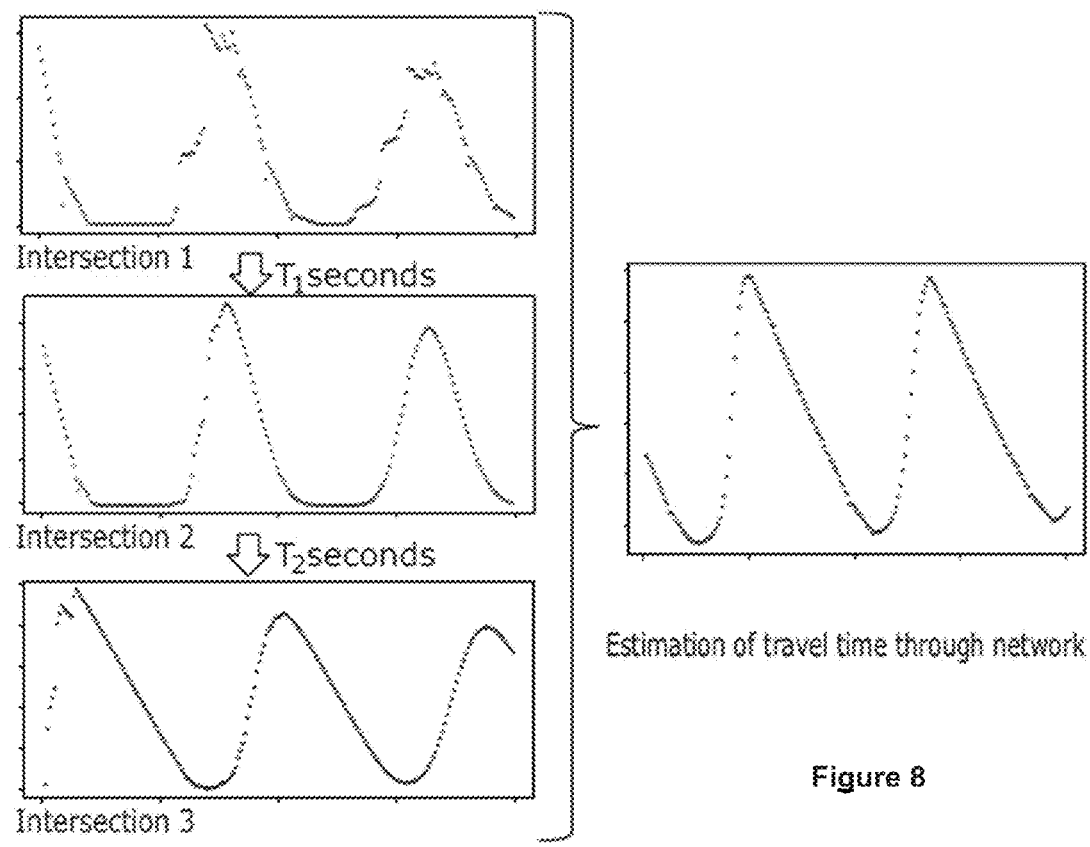
FIG. 8 shows an expected sojourn time through the network shown in FIG. 7.

To see how the expected travel times behave, we calculate the expected sojourn time for each arrival time at the first intersection. The outcome is illustrated in FIG. 8. In the example of a route with three traffic signals, we see that the current states of the traffic signals can make a difference of almost one minute for the total travel time. At the local minima, the driver will likely have a green wave.

By way of explanation, the way in which the sojourn time is calculated will be explained in greater detail.

FIGS. 5A, 5B and 5C respectively indicate the expected waiting time until next green signal at each of the intersections 4115, 4114 and 4113 respectively for t=1, 2, . . . , 200, and are based on lists of green and red times.

Let for example the arrival time at intersection 4115 be 50 seconds and $T_2=T_3=23$. The expected time the vehicle leaves intersection 4113 will be calculated by:

$$E[S(1)]=50,$$

$$E[S(2)]=50+E[W_1(50)]+23=73,$$

$$E[S(3)]=73+E[W_2(73)]+23=109,$$

$$E[S(4)]=109+E[W_3(109)]+0=150.$$

Thus the expected sojourn time of the route is: $E[S(4)]-E[S(1)]=150-50=100$, which is very high because the vehicle has to wait long at the last intersection.

For the second example, let the arrival time at intersection 4115 be 25 seconds, $T_2=21$ and $T_3=25$. The expected time the vehicle leaves intersection 4113 will be calculated by:

$$E[S(1)]=25,$$

$$E[S(2)]=25+E[W_1(25)]+21=46,$$

$$E[S(3)]=46+E[W_2(46)]+25=71,$$

$$E[S(4)]=71+E[W_3(71)]+0=71.$$

Hence, the expected sojourn time of the route is: $E[S(4)]-E[S(1)]=71-25=46$. In this case, the car does not have to wait at any intersection. This indicates that the driver will get a green wave. If a green wave is not possible, we can at least try to minimize the amount of red signals during a journey. If one of the expected waiting times is sufficiently small, the traffic signal phase predictions of the present invention can still guide the driver through a green wave without giving unnecessarily low recommended speeds.

Figure 9:
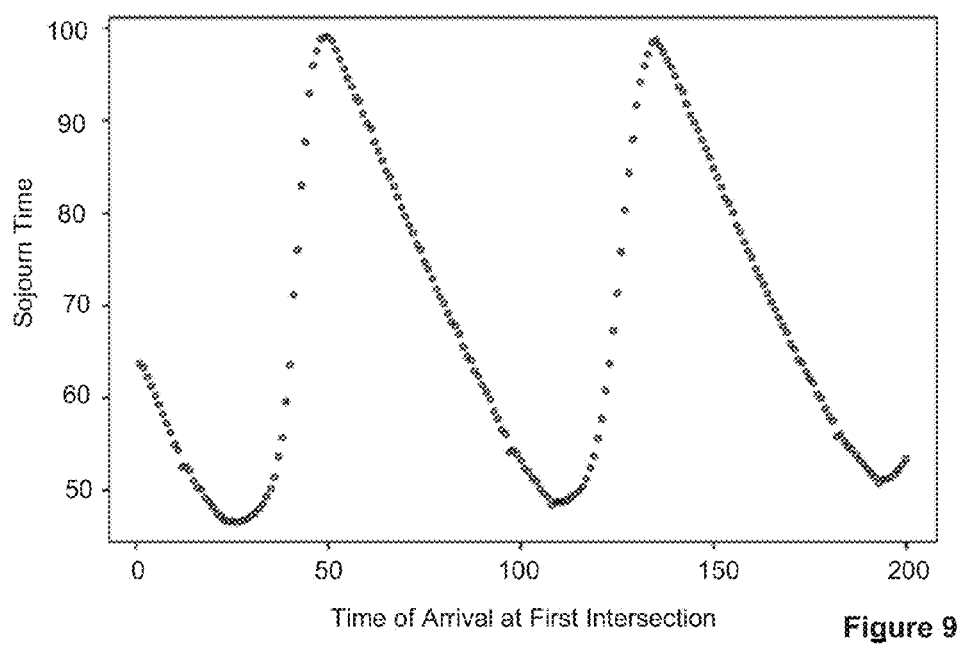
FIG. 9 shows the expected sojourn time for the route shown in FIG. 7 for all possible arrival times in the range considered.

The expected sojourn time for the route shown in FIG. 7 for all possible arrival times in the range considered is shown in FIG. 9.

Of course, alternatively or additionally to determining a travel time for a route, the expected waiting time determined in accordance with the techniques of the present invention may be applied in other ways. For example, the expected waiting time may be used to generate a fastest route from an origin or current position to a destination, accurately accounting for potential delay at traffic signals associated with intersections along the route. A route may be determined that minimises expected waiting time at signals, whether or not it is a fastest route overall. Thus, in other embodiments, candidate routes through the road network may be explored to find a route that minimises expected waiting time and/or travel time taking into account expected waiting time.

The methods of the present invention may be implemented in various manners: using a server, a navigation device, e.g. associated with a vehicles, such as a PND, or combinations of both a server and navigation device.

With each step, a decision can be taken as to whether to implement the step at a server or navigation device. The decision may be based upon the processing and/or storage power available at a server or navigation device, and how this is to be balanced with speed of obtaining the result of the processing. In general, carrying out calculations at a navigation device may be demanding upon the more limited processing and/or storage capacity of the device, but will reduce the amount of data that needs to be transmitted to/from a server, reducing demands upon available bandwidth.

Various factors may affect the time and/or processing power required for carrying out the predictions, e.g. of expected waiting time or green phase probability. The calculation time of the prediction increases exponentially if the end time increases. The calculation time is also larger if the traffic signal is more dynamically managed or the cycle length is smaller.

In some embodiments, the server stores data relating to the durations of the phases of traffic control signals in a geographic area, e.g. based upon data received from third parties, vehicle probe data, data received from traffic signals and/or vehicle to vehicle (V2V) data.

The relevant duration data may then be sent to a navigation device when required in relation to a particular traffic signal to enable the device to calculate the expected waiting time and/or green signal probability predictions.

However, other arrangements are possible. The following table summarises some of the options as to where the specified item in the left hand column is stored and/or derived. In the table below "predictions" refers to the prediction of expected waiting time and/or green and/or red signal probability with respect to time.

The items include a database of traffic control signals, e.g. coordinates of traffic control signals in the region, phase information for the signals including duration data for different instances of the phases, i.e. red and green times, and route calculation.

The predictions may only be calculated for a next approaching traffic signal along a route being followed e.g. to predict the state of an upcoming traffic signal or determine a speed recommendation to arrive coinciding with a green phase. However, where a route is being generated, e.g. to minimise waiting time, or in respect of which a travel time is required taking into account expected waiting time, it will be necessary to have knowledge of traffic signals further ahead on the route, and carry out predictions as to the operation of multiple traffic signals along the route.

In the following table some possible options as to where the various items may be performed are given, with estimated performance measures.

TABLE 1

|  | Option 1 | Option 2 | Option 3 | Option 4 |
| --- | --- | --- | --- | --- |
| Database traffic signals | Device | Server | Server | Server |
| Calculation predictions | Device | Server | Device | Device |
| Calculation route | Device | Server | Server | Device |
| Needed data transmission | Traffic signals updates | Fastest route, traffic signals predictions | Fastest route, traffic signal data e.g. phase duration lists, traffic signal updates | Traffic signal data e.g. phase duration lists, traffic signal updates, |
| Performance | | | | |
| Mobile data | ++ | -- | + | + |
| CPU device | -- | ++ | + | - |
| Memory device | -- | ++ | + | + |
| CPU Server | ++ | -- | - | + |
| Memory Server | ++ | - | - | - |
| Score | 1 | 0.5 | 2.5 | 1.5 |

For example, with option 1, the device, e.g. PND, stores the necessary phase data for traffic signals, i.e. signals in the region. This may be in the form of phase duration lists. The device then calculates the predictions of expected waiting time and/or probability of green phase with respect to time. The device may also calculate a route, and be able to obtain a route duration by determining expected waiting time for traffic signals along the route, or alternatively may determine a fastest route through the road network taking into account expected waiting time. In this arrangements, only updated traffic signal operation data, e.g. phase data.

In option 2, the server is arranged to perform all the operations that the device performed in option 1. The server would then need to transmit data indicative of a calculated route or predictions, e.g. expected waiting time, green signal probability, to a device for use.

Options 3 and 4 split the various operations between server and device. Option 3 is seen as most advantageous. In this arrangement the server stores the traffic signal operation data, and calculates routes, but predictions are carried out by the device using traffic signal operation data received from the server. Similarly the server will transmit route data to the device.

By way of example, with an arrangement in accordance with option 3, if a vehicle is navigating from A to B, a device associated with the vehicle (e.g. PND) transmits the corresponding coordinates to the server. The server calculates all possible routes and transmits the fastest route to the PND.

The location of B typically will not correspond to an end destination of the route, but rather may be a suitable location ahead of the current location, e.g. along an already calculated part of a route. This avoids the need to obtain and process traffic signal data for all traffic signals along a long route. If driving to Rome from Eindhoven for example, there is no need to give predictions for the traffic signals in Rome at the moment of leaving Eindhoven. So B can be located on an original route and will be bounded by distance or estimated travel time (for example: the upper bound can be 1000 seconds). The device will send the new locations of A and B repeatedly to check if a faster route is possible. A may be a current location.

For the fastest route the server will send the operation data for the traffic signals along the route, including current state information and data indicative of the durations of phases, i.e. phase lists. The server also sends predictions for travel times between intersections where the signals are located. In alternative embodiments the estimated travel time between intersections can also be stored in the device. If the data is more dynamic, i.e. incorporating "live" traffic information, it may be more suitably provided by the server. The device can then calculate the traffic signal phase predictions and/or expected waiting times. The device may calculate speed recommendations for display to a driver.

Every x seconds the device will receive updated traffic signal information, e.g. current phase, and will then use this information to update the predictions. As x decreases, the quality of the prediction improves, but more calculation power and data transmissions are needed.

Figure 10:
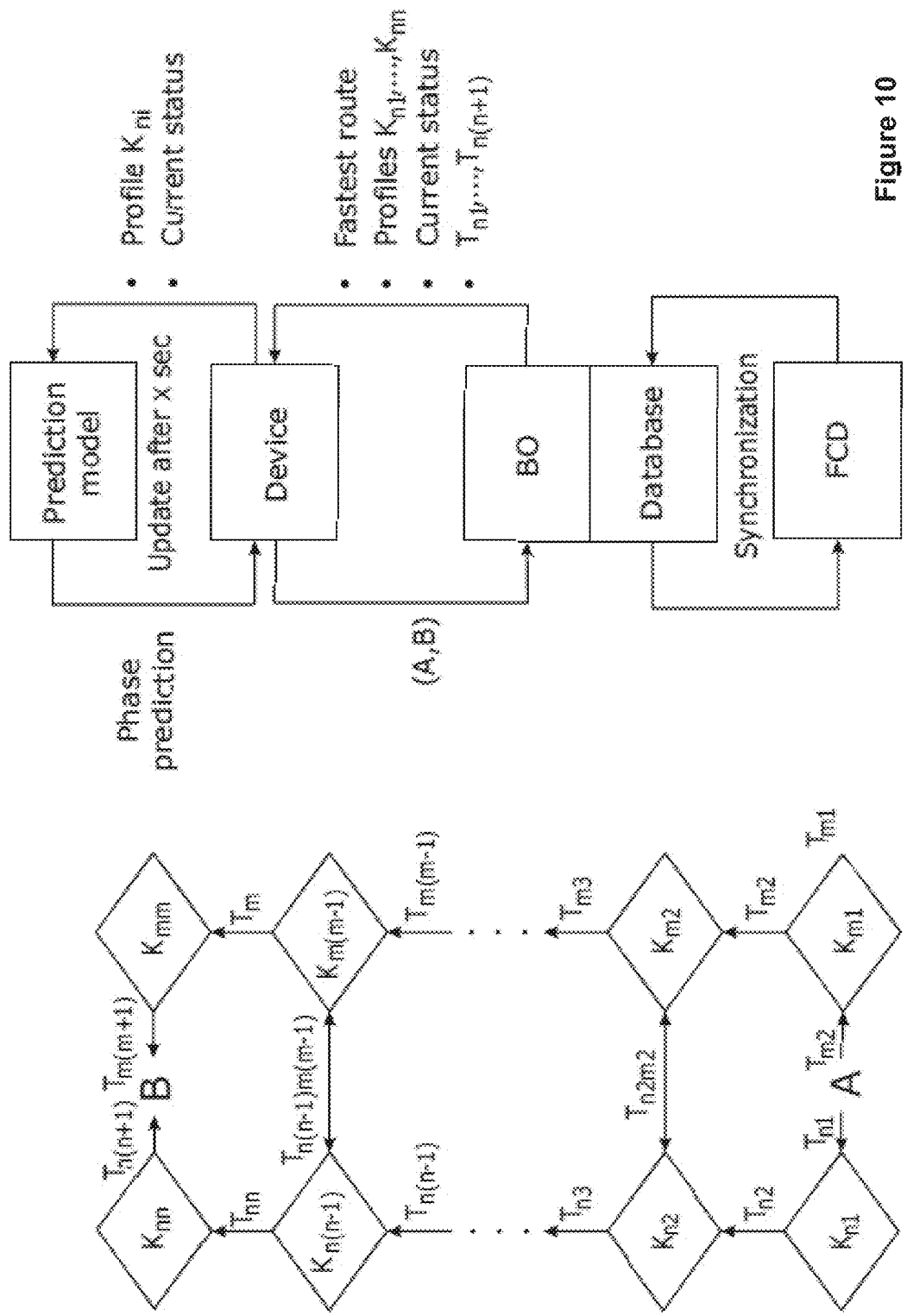
FIG. 10 shows how the processing can be distributed between a navigation device and a server.

FIG. 10 shows one possible implementation of option 3. On the left side, an example of a network between A and B is drawn. The $K_{ni}$ represents traffic signal i on route n. Define $T_{ni}$ as the travel time between intersection i-1 and i for route n. On the right, we see how option 3 is applied if route n is chosen as fastest route. Here "probe data" refers to vehicle probe data, i.e. positional data relating to the movement of devices associated with vehicles with respect to time, e.g. of mobile devices, PNDs, etc associated with the vehicles.

The methods described above may be further refined. In particular, it is useful to take account of queuing time that may be experienced by vehicles at traffic control signals. This may result in additional waiting time being experienced, such that the driver may in fact miss a green signal even if they arrive at the traffic signal at a time expected to coincide with a green signal.

One way in which compensation may be made for queue time will now be described.

With knowledge of the cycle of a traffic signal, i.e. the green/red signal cycle, it is possible to predict when the queue length will increase (during red time) and when the queue will dissolve (during green time). The current arrival rate of vehicles can be predicted, e.g. using "live" and/or historical sources of data, e.g. vehicle probe data. For example historical data may be used based upon historical arrival rates for the relevant timeslot, and adjusted if this significantly differs from the live situation. The dissolving rate can also be derived from historical data.

Figure 11A:
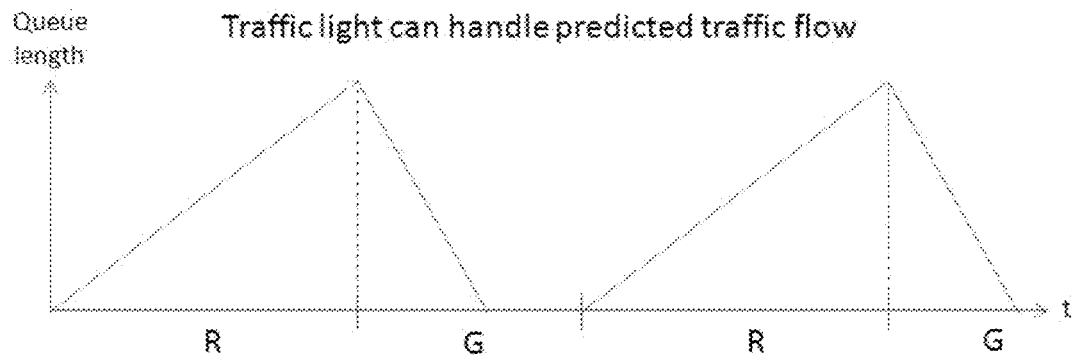
FIGS. 11A and 11B illustrate the effect of low and heavy traffic flows on queue time at a traffic control signal.

If the traffic intensity is low enough, the traffic signal is able to handle all the arriving cars during the green times. This is illustrated in FIG. 11A, wherein R and G refer to the red and green phases respectively.

Figure 11B:
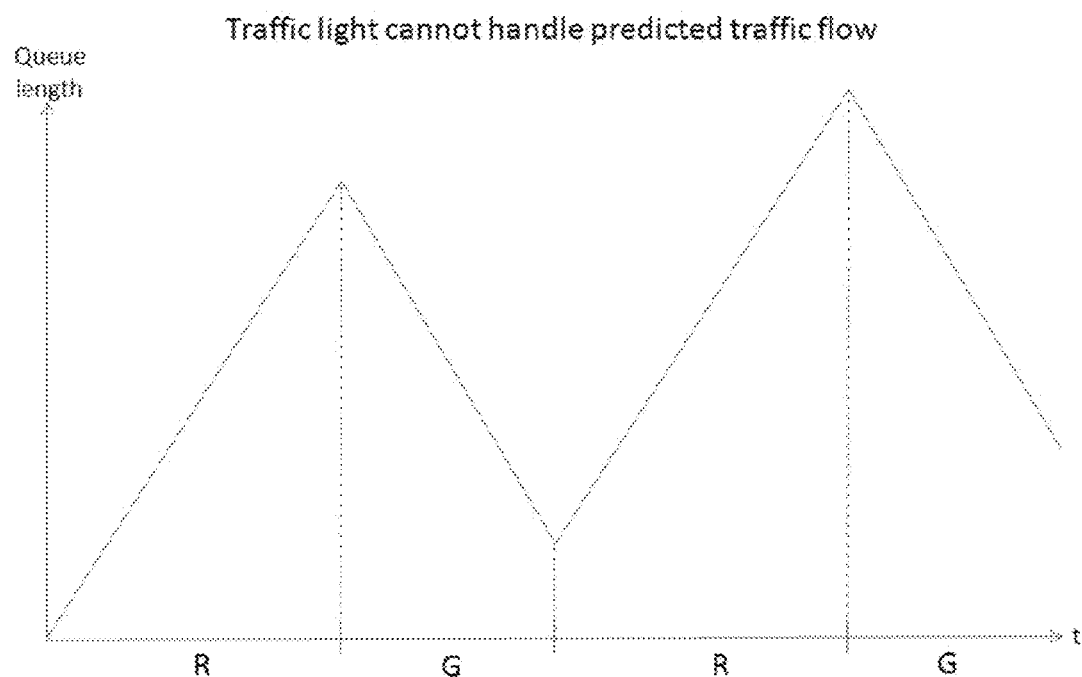

If the traffic intensity is too high, the traffic signal becomes saturated and the queue length will increase over time. This is illustrated in FIG. 11B. This will give rise to significant predicted delays at the traffic signal, and it may be advised to avoid the intersection where the traffic signal is located.

The queue length predictions may be used to derive an additional time delay attributable to queue time, which can be incorporated when estimating travel time for a route.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method for determining information relating to the operation of at least one traffic control signal, the traffic control signal being operable to transition between different phases in use, the method comprising:
    using data indicative of the durations of multiple instances of at least one phase of the traffic control signal to determine, by a processing device, for the one phase or for each phase, data indicative of a distribution of the durations of the multiple instances of the phase; and
    using the determined distribution data to obtain data, by the processing device, indicative of a probability of the traffic control signal having a given phase at one or more future time.

2. The method of claim 1, wherein the data indicative of the durations of multiple instances of at least one phase of the traffic control signal is indicative of the durations of multiple instances of the at least one phase of the traffic control signal in a given time period, and the data indicative of the distribution of the durations of the multiple instances of the or each phase is indicative of the durations of the multiple instances of the or each phase in at least a portion of the given time period.

3. The method of claim 1, further comprising obtaining the data indicative of the durations of multiple instances of the at least one phase of the traffic control signal from one or more of: a third party information, a server, the traffic control signal, a vehicle, and positional data indicative of the movement of a plurality of devices with respect to time along a path controlled by the traffic control signal.

4. The method of claim 1, wherein the at least one phase of the traffic control signal for which duration data is determined comprises a phase having a duration that is variable in response to demand.

5. The method of claim 1, wherein the probability data is obtained by determining the probability that each of said one or more future times falls within said given phase of said traffic control signal.

6. The method of claim 1, wherein the step of determining the probability data comprises determining the probability of the or each future time coinciding with the given phase for each of a plurality of possible cycle plans of the traffic control signal, and combining the probabilities for each possible cycle plan.

7. The method of claim 1, further comprising using data indicative of a timing of at least one instance of a phase of the traffic control signal in the given time period to which the duration data relates together with the duration data in obtaining the probability data.

8. The method of claim 1, wherein the probability data is indicative of the probability of the traffic control signal having the given phase with respect to time over a given future time period.

9. The method of claim 1 wherein the given phase to which the probability data relates is a phase permitting the flow of traffic along a path controlled by the signal, preferably wherein the phase has a duration that is variable in response to demand.

10. The method of claim 1, further comprising identifying data indicative of one or more maximum in the probability data with respect to time, and determining a time associated with the or each maximum.

11. The method of claim 1, further comprising using the determined probability data to provide a speed recommendation for a vehicle to enable the vehicle to arrive at the traffic control signal at or around a time which is expected to coincide with a phase of the signal allowing the passage of traffic along a path controlled by the traffic control signal based on the probability data.

12. The method of claim 1 further comprising using the obtained probability data indicative of the probability of the traffic control signal having a given phase at a future time or times to determine an expected waiting time for a vehicle when arriving at the signal at one or more future time of interest.

13. The method of claim 12, wherein the future time of interest is a time at which the vehicle is expected to arrive at the traffic control signal when following a given route, the method further comprising using the determined expected waiting time in determining an estimated travel time for the route.

14. The method of claim 12, comprising obtaining data indicative of expected waiting time with respect to time of arrival at the traffic control signal at different times in a given future time period, and using the data to determine a speed recommendation for a vehicle, wherein the speed recommendation is a speed recommendation that is expected to minimise expected waiting time at the signal.

15. The method of claim 12, wherein the or each traffic control signal is associated with navigable segments of a navigable network, the method comprising obtaining data indicative of an expected waiting time in respect of the or each traffic control signal and using the expected waiting time data in generating a route to a destination through the navigable network, optionally that minimises expected waiting time at traffic control signals along the route.

16. A system for determining information relating to the operation of at least one traffic control signal, the traffic control signal being operable to transition between different phases in use, the system comprising at least one processor and at least one memory including computer program code, the at least one memory and the computer program code configured to, with the at least one processor, cause the apparatus to at least:
   use data indicative of the durations of multiple instances of at least one phase of the traffic control signal to determine, for the one phase or for each phase, data indicative of a distribution of the durations of the multiple instances of the phase; and
   use the determined distribution data to obtain data indicative of a probability of the traffic control signal having a given phase at one or more future time.

17. A non-transitory computer readable medium comprising computer program code that, when executed on a computer, cause the computer to perform a method according claim 1.

* * * * *